US005561282A

United States Patent [19]

Price et al.

[11] Patent Number: 5,561,282

[45] Date of Patent: Oct. 1, 1996

[54] PORTABLE SIGNATURE CAPTURE PAD

[75] Inventors: James F. Price, Alpharetta; James M. Widdel, Kennesaw, both of Ga.

[73] Assignee: MicroBilt Corporation, Atlanta, Ga.

[21] Appl. No.: 306,003

[22] Filed: Sep. 14, 1994

Related U.S. Application Data

[63] Continuation-in-part of Ser. No. 56,316, Apr. 30, 1993, Pat. No. 5,448,044.

[51] Int. Cl.[6] .......... G06K 9/00

[52] U.S. Cl. .......... 235/380; 178/18

[58] Field of Search .......... 235/380, 472; 178/18; 902/3

[56] References Cited

U.S. PATENT DOCUMENTS

| | | | |
|---|---|---|---|
| 3,806,704 | 4/1974 | Shinal | 235/380 |
| 4,396,985 | 8/1983 | Ohara . | |
| 4,454,414 | 6/1984 | Benton . | |
| 4,460,965 | 7/1984 | Trehn et al. . | |
| 4,578,671 | 3/1986 | Flowers . | |
| 4,588,881 | 5/1986 | Pejas et al. . | |
| 4,634,845 | 1/1987 | Hale et al. . | |
| 4,683,586 | 7/1987 | Yamamoto . | |
| 4,721,849 | 1/1988 | Davis et al. . | |
| 4,722,054 | 1/1988 | Yorozu et al. . | |
| 4,752,965 | 6/1988 | Dunkley et al. . | |
| 4,827,113 | 5/1989 | Rikuna . | |
| 4,839,854 | 6/1989 | Sakami et al. . | |
| 4,935,608 | 6/1990 | Tanaka . | |
| 5,057,676 | 10/1991 | Komaki . | |
| 5,115,107 | 5/1992 | Crooks et al. . | |
| 5,123,064 | 6/1992 | Hacker et al. . | |
| 5,189,287 | 2/1993 | Parienti . | |
| 5,189,291 | 2/1993 | Siemiatkowski | 235/472 |
| 5,195,133 | 3/1993 | Kapp et al. | 235/380 |
| 5,202,825 | 4/1993 | Miller et al. . | |
| 5,218,188 | 6/1993 | Hanson . | |
| 5,220,520 | 6/1993 | Kessoku . | |
| 5,227,590 | 7/1993 | Protheroe et al. | 178/18 |
| 5,227,614 | 7/1993 | Danielson et al. . | |
| 5,241,488 | 8/1993 | Chadima, Jr. et al. . | |
| 5,243,149 | 9/1993 | Comerford et al. . | |
| 5,247,164 | 9/1993 | Takahashi . | |
| 5,267,147 | 11/1993 | Harshaw et al. . | |
| 5,278,399 | 1/1994 | Sano | 178/18 |

FOREIGN PATENT DOCUMENTS

| | | | |
|---|---|---|---|
| 64088 | 3/1989 | Japan | 902/3 |

*Primary Examiner*—John Shepperd
*Attorney, Agent, or Firm*—Jones & Askew

[57] ABSTRACT

A portable signature capture pad operative for gathering signature data associated with customer transactions includes a digitizer, microprocessor, and a pad cradle that facilitates a wireless data link between the portable signature capture pad and a point-of-sale (POS) terminal, such as an electronic cash register. Subsequent to receiving a ready signal from the POS terminal, the portable signature capture pad is removed, temporarily disconnecting the pad from communication with the pad cradle and thus the POS terminal. A transaction receipt is printed at the POS terminal and placed on the portable signature capture pad. The portable signature capture pad and receipt are presented to a customer for signature capture. Data signals corresponding to the customer's signature are captured by the digitizer and stored in a memory in the pad. The pad is then returned to the cradle. Through the wireless data link, the pad downloads the captured signature signals to the POS terminal in response to a download command received from the POS terminal. The pad also includes a power source that may be recharged using a novel routine disclosed herein. Uncompressed signature data may be used to provide a facsimile signature on a display or printer at the POS terminal, whereby the signature may be approved by the operator.

37 Claims, 21 Drawing Sheets

PAD STATUS TABLE

| PAD IDENTIFICATION NUMBER | PAD AWAY FROM CRADLE | PAD AWAY LONGER THAN PREDETERMINED WAIT | DATA DOWNLOADED FROM PAD | BATTERY STATUS | BATTERY BEING CHARGED |
|---|---|---|---|---|---|
| 1 | YES/NO | YES/NO | YES/NO | GREATER/ LESS THAN 50% | YES/NO |
| 2 | " | " | " | " | " |
| 3 | " | " | " | " | " |
| | " | " | " | " | " |
| | " | " | " | " | " |
| n | " | " | " | " | " |

FIG. 22

PORTABLE SIGNATURE CAPTURE PAD

CROSS REFERENCE TO RELATED APPLICATION

This application is a continuation-in-part of U.S. patent application Ser. No. 08/056,316, filed Apr. 30, 1993, entitled "Signature Capture Pad" now U.S. Pat. No. 5,448,044.

TECHNICAL FIELD

The present invention relates to a signature capture device, and more particularly relates to a signature capture pad for digitizing a signature provided in conjunction with a financial transaction.

BACKGROUND OF THE INVENTION

Over the last 20 years, credit cards have gained widespread acceptance as a means of paying for goods and services. In 1991, American consumers used credit cards to spend an excess of $250 billion. Worldwide, the value of credit card transactions exceeded $600 billion. The large volume of credit card transactions requires merchants to collect, transmit, and store vast amounts of transaction related data.

As used herein, the term "credit card" is intended to include credit cards, charge cards, debit cards, and other financial account cards. Credit cards typically include two sources of essential account information. A magnetic stripe includes the account number, expiration date, cardholder's name, and other information. Embossed characters also provide the account number, expiration date, and cardholder's name in a form that may be recognized by a merchant.

In order for a credit card transaction to be processed, a merchant must collect a variety of data associated with the transaction. This data typically includes the purchase price and date of the transaction, the account number and expiration date of the credit card, and the cardholder's name and signature. Once this data is collected, the merchant transmits the transaction data, along with its merchant identification code, to a credit card transaction processor. The credit card processor sorts the data according to the company that issued the credit card, and forwards the data to the appropriate company. At that point, the credit card issuer posts the transaction to the cardholder's account and the purchase amount is credited to the merchant.

The credit card processor facilitates the flow of information and funds between merchants and credit card issuers. This process is described more completely in co-pending U.S. application Ser. No. 07/820,401, filed Jan. 10, 1992, entitled "Data Card Terminal with Embossed Character Reader and Signature Capture", and assigned to the assignee of the present invention, the disclosure of which is incorporated herein by reference and made a part hereof. (The foregoing application hereinafter will be referred to as the "signature capture terminal application").

Formerly, credit card transaction data was recorded, transferred, and stored in the form of paper receipts. Over the years, the credit card industry has developed various types of equipment that provide for the electronic acquisition, transmission, and storage of transaction data. In addition to reducing the industry's reliance on paper records, this equipment expedites the processing of credit card transactions and minimizes errors associated with the entry of transaction data. The equipment includes point-of-sale (POS) equipment used by merchants and computer systems used by credit card processors.

Most merchants employ a cash register system of some type in order to record data associated with transactions, regardless of whether payment is made with cash, check, or credit card. In addition to a cash register, merchants that accept credit cards use other POS equipment to collect data associated with the credit card. This equipment usually includes electronic terminals that read the account number and expiration date from a magnetic stripe on the credit card and transmit the transaction data to the credit card processor. Such equipment may be separate from, or integrated into, the cash register equipment.

In a typical credit card transaction, a cardholder presents a credit card to a merchant, who records transaction data using an electronic terminal. The recorded data includes the amount of the purchase, the cardholder's account number, the card's expiration date, the merchant identification number, and the date of the transaction. In most cases, the cardholder is also required to sign a copy of the receipt.

Once the terminal accumulates the transaction data, the terminal automatically dials the merchant's credit card processor or other authorization source and initiates an authorization request. When the transaction is authorized, the terminal displays and/or stores the approval code or authorization indicia received from the credit card processor. The approval code is recorded along with the other transaction data. The POS equipment typically includes a printer that is capable of printing a sales receipt. The sales receipt includes the transaction data and approval code, and provides a space for the cardholder's signature.

These prior art devices allow numeric data, such as purchase price, date, account number, and merchant identification number to be easily accumulated, stored, and transmitted between the merchant and credit card processor. Consequently, numeric transaction data may be transferred and stored without the use of paper receipts. Although this numeric data is sufficient to process the transaction, it may be insufficient to validate or authenticate a transaction that is disputed by the cardholder. In the event a cardholder questions or denies the legitimacy of a transaction that appears on his or her credit card statement, it may be necessary for the merchant to produce a copy of the signed receipt as evidence that the cardholder was a party to the transaction. Therefore, it is necessary that a copy of each signed receipt be retained by the merchant for some period of time.

This process of retaining and retrieving signed receipts is simplified if the merchant employs POS equipment that allows the cardholder's signature to be digitized, transmitted, and stored along with the numeric data associated with the transaction. In such cases, the signature is digitized as the cardholder signs the credit card receipt. The digitized signature data and numeric transaction data are combined and transmitted to the credit card processor, where the data is stored for a predetermined period of time. If a cardholder disputes the validity of a transaction, the entirety of the transaction data, including a facsimile of the signature, may be provided by the credit card processor, and may serve as evidence of the legitimacy of the transaction. This process and a terminal that includes a signature capture printer are described in the above-referenced signature capture terminal application.

Many merchants have invested significant amounts of money in POS equipment, such as sophisticated electronic cash registers, that allows the merchant to collect all of the numeric data associated with credit card transactions. In the case of larger merchants, the POS equipment may be connected to a merchant's accounting computer system or "in-store processor" via a data communications network in order to facilitate the merchant's business operations. Although it may be advantageous to capture signatures in such cases, it is not cost effective or convenient to do so if it is necessary to add additional printers or terminals that duplicate the merchant's existing capabilities. Furthermore, a merchant's existing POS equipment may be connected to peripheral devices, such as check readers for automatically reading checking account data and PIN pads, which are used to input a debit card user's personal identification number (PIN). The existing POS equipment may not provide sufficient communications ports to allow the merchant to connect additional peripheral devices.

In order to facilitate the automatic collection of transaction data, it would be desirable to provide a signature capture device that could be used in conjunction with existing electronic cash registers and POS terminals. U.S. Pat. No. 5,120,906 to Protheroe et al. (the "'906 patent") and U.S. patent application Ser. No. 07/575,096, of Allgeier et al., filed Aug. 30, 1990, describe signature capture devices that may be used in conjunction with existing POS equipment.

The Allgeier application describes a write input device that employs a display underneath a transparent digitizer in order to capture signature information. The '906 patent correctly notes that the liquid crystal display of the Allgeier device makes it expensive. The display also increases the amount of power consumed by the device. Consequently, such devices often require a separate power supply. Liquid crystal displays also provide a limited viewing angle. Because the liquid crystal display is set up to be viewed clearly by the customer, it is difficult for the merchant to see the displayed signature and compare it to the signature on the back of the credit card.

The '906 patent describes an inexpensive pressure sensitive digitizer that does not have a display. Although this device eliminates the costs attributable to the display, pressure sensitive digitizers experience several problems when used in POS applications. A pressure sensitive digitizer consists of two electrically coated surfaces that are separated by spacers. The digitizer's sensitivity is determined by the distance between the spacers. If the digitizer is sensitive enough to respond to light writing pressure, it also is likely to respond to coincident finger contact that occurs when a customer is signing a receipt. Decreasing the sensitivity in order to avoid responses to finger contact results in increased writing force being required for the signature. Consequently, the digitizer may fail to capture light handwriting strokes. Wear from repeated use damages the coated surfaces and leads to position errors in the digitized signals. Furthermore, pressure sensitive digitizers do not accurately capture signatures when thick or multi-part forms are used.

In addition to the foregoing considerations, inexpensive add-on signature capture devices should provide flexibility and be configurable for use with POS systems having a variety of capabilities. For example, limits on the POS system's storage capacity may require that the signature capture device provide compressed signature signals, and that the size of the signature data be limited to a maximum compressed signature size selectable by the merchant. Likewise, the merchant's POS system may be powerful enough to compress the digital signature signals received from the signature capture device. Therefore, the merchant may prefer to receive uncompressed digitized signature signals and perform the compression at the electronic cash register or in-store processor. Each electronic cash register also may include a display or printer capable of producing a facsimile signature corresponding to the digitized signature signals. Providing a facsimile signature at the point-of-sale allows the merchant to indicate whether the digitized signature is acceptable prior to the completion of the transaction. An adjunct signature capture device also should preserve the merchant's ability to use other peripheral devices in conjunction with its POS devices.

Further, inexpensive add-on signature capture devices should be designed for ease of use with POS equipment in a wide variety of POS environments. For example, the merchant's sales counter may include a display in which jewelry, cameras, electronic equipment or other items may be seen, but not accessed, by customers. Such a counter is often long, allowing several customers to simultaneously inspect items at a significant distance from the electronic cash register. To better accommodate these customers, the merchant may wish to obtain customer signatures on a transaction receipt at a counter location remote from the electronic cash register. Likewise, in this and other POS environments, the merchant may wish to present sales receipts to customers at a counter location away from the electronic cash register in order to prevent customer lines from forming at the register. An inexpensive add-on signature capture device should give a merchant the flexibility to conduct sales transactions in such aforementioned situations.

Therefore, there is a need in the art for a cost-effective signature capture pad that may be added to existing POS equipment. Because POS equipment has differing capabilities, there is a need for a flexible signature capture pad capable of providing signature data in a variety of user-selectable formats. Furthermore, because some POS equipment includes interconnected peripheral devices having a limited number of communications ports, there is a need for a signature capture pad that may be connected to existing POS equipment, and that facilitates data communication between POS equipment and peripheral devices.

SUMMARY OF THE INVENTION

The present invention is a signature capture pad operative to gather digitized signature data associated with financial transactions, such as credit card transactions, at the point-of-sale. In order to accomplish this, the preferred signature capture pad is equipped with a digitizer and serial communications ports and is particularly suitable for connection to a merchant's existing point-of-sale terminals or electronic cash registers. In addition, an alternative embodiment provides a personal identification number (PIN) pad. The preferred signature capture pad provides an additional serial communication port that may be connected to peripheral devices such as a MICR check reader, embossed card reader, PIN pad or other serial devices.

By digitizing a signature provided in conjunction with a financial transaction, the signature data may be associated with numeric transaction data obtained by other POS equipment, and stored electronically. By allowing the signature to be stored electronically along with numeric transaction data, the signature capture pad eliminates the need for merchants to store vast amounts of paper receipts. In addition, the signature capture pad allows a merchant to obtain all of the transaction data necessary for optional chargeback protection services offered by certain transaction guarantors.

The signature capture pad is flexible and may be configured in accordance with the capabilities of the POS terminal or electronic cash register. If desired, the signature capture pad will digitize the signature data, compress it, and provide the compressed signature data to the POS terminal. The POS terminal may establish a maximum size for the compressed data. If the data exceeds this limit, the signature capture pad will select a lower resolution and post-process the data to obtain new compressed signature data. If desired, the signature capture pad will provide a message to the POS terminal and request the receipt to be re-signed so that it may be digitized at the lower resolution.

Alternatively, the signature capture pad will provide raw digitized data to the POS terminal. This allows the signature data to be compressed at the POS terminal using a compression algorithm selected by the merchant.

The POS terminal also may use the compressed or raw signature data from the signature capture pad to provide a facsimile signature corresponding to the signature data. The facsimile signature may be displayed on a display or printed by a printer. In either case, the merchant may examine the signature and determine whether it corresponds to the authorized signature appearing on the back of the credit card. Likewise, the merchant may determine whether the quality of the digitized signature is acceptable. In either case, the merchant may terminate the transaction if the signature is unacceptable, or cause the customer to re-sign the receipt.

A signature capture cycle is terminated upon receipt of a signature termination signal, which is asserted after the signature is completed. The signal may be provided manually by the merchant, whereby the POS terminal sends a "exit signature capture" signal to the signature capture pad. The signature capture pad also provides an optional timer that will time out after the signature is complete and a predetermined period of time has elapsed. The time period may be selected by the merchant.

Briefly described, the signature capture pad of the present invention is able to perform the above-described functions by providing a digitizer that is operative to provide digitized signature signals corresponding to a signature written on a receipt, and serial communications ports for providing said digitized signature signals to a POS terminal. The POS terminal includes a display, a keypad, and a device such as a magnetic stripe reader for obtaining numeric data associated with the transaction. The POS equipment also includes a printer for printing a receipt. A remote host computer receives transaction data from said terminal. The signature capture cycle is terminated upon the receipt of a signature termination signal. If desired, the signature capture pad is capable of providing compressed signature signals.

More particularly described, a transaction processing system employing the preferred signature capture pad includes a terminal that includes a keypad and is capable of obtaining numeric data associated with the financial transaction. The system includes a signature capture device that includes a digitizer for providing digitized signature signals corresponding to a signature received during a signature capture cycle. The signature capture device provides a timer for indicating the passage of a user-selectable period of time since the last digitized signature signal was received from the digitizer. The signature capture cycle may be terminated upon receipt of a signal from the timer or upon actuation of a key on the keypad that allows an operator to indicate the signature is complete.

Thus, the present invention provides a standalone signature capture pad that is independent of the POS terminal. The signature capture pad is operative for acquiring signature information in connection with a financial transaction and for communicating the signature information to the POS terminal. The is selectively configurable for providing compressed or uncompressed signature information in response to a signal received from the POS terminal.

When the preferred signature capture pad is used in conjunction with an existing POS terminal, it provides point-of-sale equipment operative to collect numeric data associated with a transaction and a printer for printing a receipt including a signature line. The signature capture pad includes a digitizer for providing digitized signature signals corresponding to the signature. The signature capture pad is operative to provide compressed signature signals corresponding to the digitized signature signals and allows the merchant to determine the user selectable resolution and maximum compressed writing size. After the signature is compressed, the signature capture pad compares the size of said compressed signals to the maximum compressed writing size and communicates the compressed signature to the POS terminal if the maximum size is not exceeded. If the maximum compressed writing size is exceeded, the signature capture pad automatically adjusts the resolution and redigitizes the signature signals, or instructs the merchant to have the customer resign the receipt so the signature may be digitized at the new resolution. The POS terminal includes means for associating the compressed signals with the numeric transaction data.

According to another aspect of the present invention, a signature capture/PIN pad includes an electromagnetic digitizer including a grid and a stylus. The grid is mounted beneath the top surface and the digitizer is operative to provide digital signals corresponding to a signature. The PIN pad includes a display and a keypad, and is operative to provide numeric signals in response to the actuation of said keypad. A microprocessor receives signals from the digitizer and the PIN pad, and provides the signals to the POS terminal. The signature capture pad also includes a rectangular guide for aligning a receipt over the digitizer.

According to another aspect of present invention, a signature capture pad according to the present invention may be used in conjunction with a POS terminal to carry out a method for recording transaction information associated with a financial transaction. The method includes the steps of providing a terminal having a display and a keypad, acquiring numeric data associated with said transaction, providing a remote host computer operative to communicate with the terminal, providing a printer for printing a receipt, and printing the receipt. A standalone signature capture pad is provided. The signature capture pad includes a digitizer that is operative to provide digitized signature signals corresponding to a signature written on the receipt. After the receipt is placed upon the signature capture pad, the signature capture pad digitizes the signature to produce digitized signature signals. The digitized signature signals are communicated to the terminal, and the signature capture cycle is terminated when the signature is complete, as indicated by the expiration of an optional, user selectable timer, or a manual signal sent by the user. If desired by the user, the signature signals are compressed by the signature capture pad prior to being sent to the POS terminal.

More particularly described, the signature capture pad of the present invention, when used with a POS terminal capable of acquiring numeric transaction data and a printer, allows a merchant to acquire numeric transaction data, indicate a maximum compressed signature size, place a receipt on the signature capture pad, and obtain a signature on the receipt. As the customer signs the receipt, the signature capture pad's digitizer provides digital signature signals corresponding to the signature, compresses the signature, and compares the size of the compressed signature to the maximum compressed signature size selected by the merchant. If the size of the compressed signature is less than or equal to the maximum compressed signature size, the signature capture pad transmits the compressed signature to the POS terminal. If the size of said compressed signature is greater than the maximum compressed signature size, the signature capture pad provides an indication to the point of sale terminal.

More particularly described, the signature capture pad provides user selectable parameters that may be set by the merchant to control the signature pad's output. The merchant is able to determine the resolution used by the digitizer when digitizing the signature and the maximum size of the compressed signature. After the numeric transaction data is collected by the POS terminal, the customer signs a printed receipt. The signature is compressed using the selected resolution. If the size of the compressed signature signals does not exceed the maximum compressed signature size, the compressed signature signals are provided to the POS terminal, where the signature data is associated with the numeric data.

According to another aspect of the present invention, a signature capture pad may be connected between a POS terminal and a peripheral device. In this case, the merchant provides a signature capture pad for acquiring signature information independently of POS terminal. The signature information is related to a transaction being handled at the POS terminal. The merchant also provides a peripheral device for acquiring additional transaction data independently of the electronic cash register. The additional transaction data also is related to the transaction being handled at the POS terminal. The signature capture pad is connected in series between the POS terminal and the peripheral device. The signature capture pad receives signals between the POS terminal and the peripheral device. The signature capture pad determines the intended destination of the signals and responds to predetermined signals intended for it by performing functions associated with the signature capture pad. Signals not intended for the signature capture pad are forwarded to the peripheral device.

According to another aspect of the present invention, a signature capture pad is provided which includes a digitizer, a first communications port for communicating with a host system, and a second communications port for communicating with a peripheral device. The said signature capture pad is operative for communicating with the host system and with the peripheral device, and for transferring data between the host system and the peripheral device.

According to another aspect of the present invention, the size of the compressed signature may be controlled by providing a signature capture pad including a digitizer for providing digitized signature signals corresponding to a signature. The signature capture pad is operative to compress the digitized signature signals to form compressed signature signals and the signature capture pad also provides user selectable resolution and user selectable maximum compressed signature size. A first signature capture pad resolution and maximum compressed signature size are selected. The signature is digitized to form digitized signature signals, which are compressed using the first signature capture pad resolution. The compressed signature signals are compared to the maximum compressed signature size.

According to another aspect of the present invention, a signature capture pad housing is provided which includes a stylus receptacle that safely retains the stylus. The stylus receptacle includes an elongate receptacle for holding a stylus. The receptacle is formed in the top portion of the housing and extends from an edge of the housing top portion. The receptacle has an opening into the interior of the signature capture pad. A stylus support is formed on the housing bottom portion in a position adjacent to the receptacle opening. The stylus support include two outside parallel walls and two interior parallel walls. The distance between the exterior walls is slightly greater than the diameter of the stylus barrel. The distance between the interior walls is greater than the writing tip. The stylus support and receptacle securely retain the stylus while preventing the tip from resting against a portion of the housing. The receptacle retains the stylus so the stylus is located beneath the top surface of the signature capture pad.

An alternative embodiment of the present invention is a portable data capture pad that is capable of capturing customer data while being disconnected from communication with associated POS equipment. The POS equipment is of the type used with the signature capture pad of the preferred embodiment of the present invention. The portable pad includes a data capture device, such as a digitizer or a PIN pad, a memory, and a battery. The data capture device captures and stores data corresponding to a transaction while the portable pad is removed from communication with the POS equipment. The battery supplies power to the portable pad and allows the portable pad to function in a data capture mode when the portable pad is removed from communication with the POS equipment.

The portable data capture pad in this alternative embodiment is associated with a data capture pad cradle that is connected to the POS equipment. Both the data capture pad cradle and the portable data capture pad have wireless data links that allow the portable data capture pad to communicate with the POS terminal when the portable pad rests in the pad cradle so that the wireless data links of the portable pad are in operative proximity with the wireless data links of the pad cradle.

More particularly described, the portable pad and the pad cradle wireless data links comprise infrared light emitting diodes and phototransistor detectors located in both the portable pad and the pad cradle. As the portable pad is activated for data capture upon receiving a ready signal from the POS terminal through these wireless data links, a light emitting diode on the pad becomes illuminated.

More particularly described, the portable pad data capture device is a digitizer operative for capturing signature signals from a customer as the customer signs a transaction receipt placed on the portable pad. The captured signature signals are then stored in the pad memory.

More particularly described, the portable pad further includes a signature termination circuit that ends the pad signature capture mode when the pad is placed back in the cradle and a signal is received from the POS terminal. To conserve battery power, the pad will also end signature capture mode if the pad is not returned to the cradle within a predetermined amount of time. The portable pad also includes a clock that tracks the power level of the battery in the portable pad. The host system periodically monitors the clock and alerts the cashier, via the POS terminal display, as to the remaining battery power level. The pad causes an LED on the pad to blink when the estimated remaining power is less than 50%. The portable pad further includes a battery charging jack that allows the battery to be charged by a battery charger when the battery falls below the specified level of power. The battery charger charges at full charge and, upon indication of a complete charge, switches to a tricklc charge.

The panel of the portable pad cradle also includes a battery charger for charging the portable pad battery. A switch in the connector that connects the battery charger to the portable pad battery indicates when the portable pad is being charged. The cradle further includes a light emitting diode that indicates, during the charging of the battery, that the battery is being charged. The cradle may allow communication of data between the terminal and a plurality of portable pads.

According to another aspect of the alternate embodiment, there is provided a method for recording transaction information, including the steps of providing a terminal with an input device and an output device, acquiring numeric data associated with the transaction, providing a remote host computer operative to communicate with the terminal, and providing a printed receipt associated with the financial transaction. This method includes the steps of providing a portable pad having a digitizer and a memory, where the digitizer captures digitized signature signals corresponding to a signature written on a transaction receipt; providing a pad cradle for accepting the portable pad and for communicating the digitized signals to a transaction terminal; removing the portable pad from the cradle; placing a transaction receipt on the portable pad; digitizing and storing the signature or other information written on the receipt; placing the portable pad back in the cradle; and communicating the digitized signals to the terminal from the portable pad through the cradle.

More particularly described, the digitized signals are communicated to the terminal through a wireless optical data link between the portable pad and the pad cradle. The digitized signals may also be compressed after they are digitized. The method further includes the step of detecting that the portable pad has been placed back into the cradle before the step of communicating the digitized signals to the terminal from the pad through the cradle. The method also includes the step of receiving a ready signal from the terminal before the step of removing the pad from the cradle for digitizing and storing the written information.

More particularly described, the method may include the steps of having the host first query to make sure that the pad is in the cradle and then having the host send a "Get Signature" command to the pad before the step of removing the pad from the cradle to receive the written information. If the pad is not found in the cradle, the method includes the step of alerting the POS terminal that the pad is not in the cradle. The method may further include the step of receiving a signal from the terminal to send the received information after the step of placing the portable pad back into the cradle. Finally, the method may include the step of forwarding all information captured at the portable pad, along with all other associated transaction information, to a host computer system.

According to another aspect of the alternate embodiment, there is provided a method for coordinating a plurality of portable pads controlled by a central transaction terminal. The method includes the steps of providing pad identification information at a particular pad, removing the pad from communication with the central terminal to receive remote transaction information for the transaction associated with the pad; storing this information at the pad; resuming communication between the pad and the terminal; transmitting the remote transaction information, along with the pad identification information, back to the central transaction terminal; combining all information relating to the transaction at the central transaction terminal into a data packet: and transmitting the data packet to a host computer.

According to another aspect of the present invention, there is provided a method for charging a battery in a portable data acquisition pad that is in communication with a point of sale system. This method includes the steps of tracking the power level of the battery; continuously monitoring the power level of the battery from the point of sale system; receiving a warning signal from the point of sale system when the power level of the battery has fallen below a specified level; providing indication at the portable pad that the power level of the battery has fallen below a specified level; connecting the battery and the portable data acquisition pad to a battery charging circuit; charging the battery to full power level through the battery charging circuit; receiving a charge complete signal at the portable pad from the battery charging circuit; indicating at the portable pad that the battery has been charged to full power level; and switching the battery charging circuit to a trickle charge when the battery has reached this full power level.

Accordingly, it is an object of the present invention to provide a signature capture pad for digitizing a signature associated with a financial transaction.

It is another object of the present invention to provide a signature capture/PIN pad for capturing a signature or obtaining numeric data associated with a financial transaction.

It is another object of the present invention to provide a signature capture pad that is usable in conjunction with an existing point-of-sale terminal.

It is another object of the present invention to provide a signature capture device capable of selectively providing compressed or uncompressed signature signals to a point-of-sale terminal.

It is another object of the present invention to provide a signature capture pad capable of terminating a signature capture cycle upon receipt of an operator-initiated command or an automatic timer output.

It is another object of the present invention to provide signature signals that may be printed by a printer so that a signature may be approved by a user.

It is another object of the present invention to provide signature signals that may be displayed on a display so that a signature may be approved by a user.

It is another object of the present invention to provide a signature capture pad having user-selectable digitizer resolution.

It is another object of the present invention to provide a signature capture pad having a user-selectable maximum compressed signature size.

It is another object of the present invention to provide a signature capture pad capable of comparing compressed signature data to a user-selectable maximum compressed signature size and, if the signature data is too large, decreasing the digitizer resolution and redigitizing the signature.

It is another object of the present invention to provide signature capture pad having an electromagnetic digitizer capable of digitizing a signature provided on a multi-part form.

It is another object of the present invention to provide a signature capture pad capable of being connected between a POS terminal and a peripheral device, and routing data between the POS terminal and peripheral device.

It is another object of the present invention to provide a signature capture/PIN pad capable of providing personal identification number data obtained in conjunction with a financial transaction.

It is another object of the present invention to provide a stylus receptacle and support that prevent the stylus writing tip from coming in contact with the stylus housing.

It is another object of the present invention to provide a portable signature capture pad that communicates with a POS terminal and a host computer system through a wireless data link with a signature capture pad cradle.

It is another object of the present invention to provide a plurality of portable signature capture pads that include associated pad identification information and that communicate with a POS terminal and a host computer system through a wireless data link with at least one signature capture pad cradle.

It is another object of the present invention to provide a portable signature capture pad cradle that holds a portable signature capture pad and that, upon a low power indication from the pad, may be connected to the pad for charging purposes.

These and other objects, features and advantages of the present invention may be more clearly understood and appreciated from a review of the following detailed description of the preferred embodiments and by reference to the appended drawings and claims.

BRIEF DESCRIPTION OF THE DRAWINGS

FIG. 22 is a table illustrating pad status information that a host computer tracks when multiple portable pads are used in a POS environment.

DETAILED DESCRIPTION OF THE PREFERRED EMBODIMENT

Figure 1:
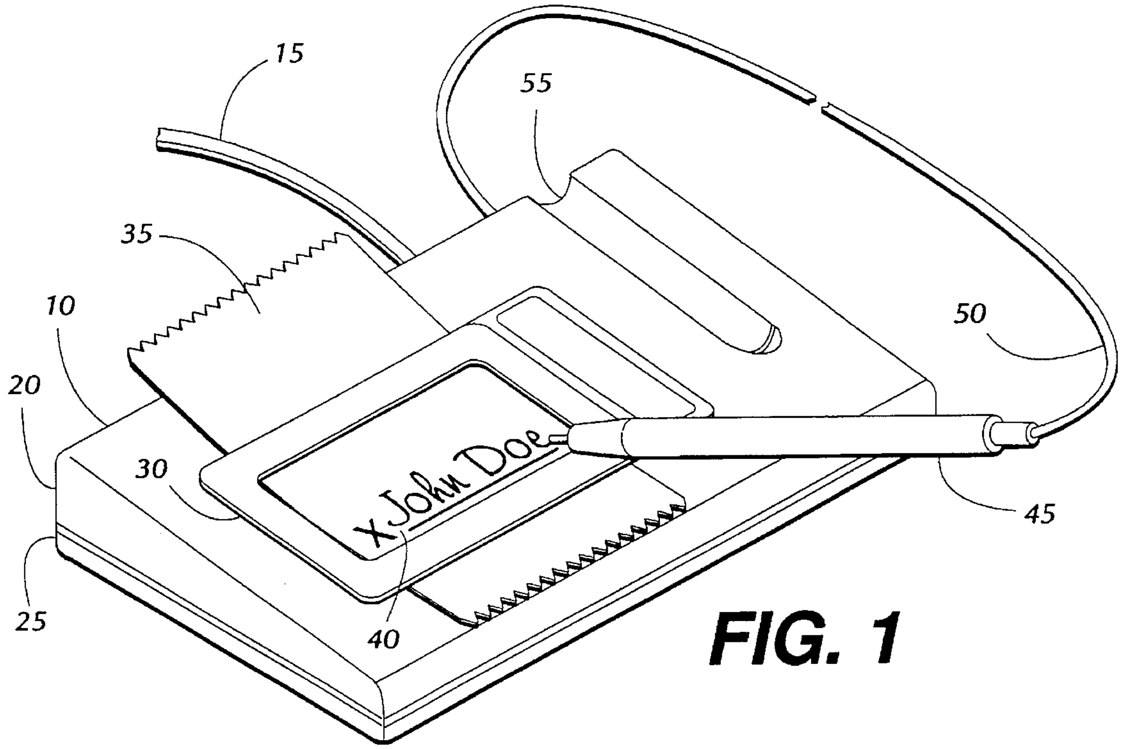
FIG. 1 is a perspective/view of a signature capture pad constructed in accordance with the preferred embodiment of the present invention.

Referring now the drawings, in which like numerals represent like elements throughout the several figures, FIG. 1 shows a signature capture pad 10 constructed in accordance with a preferred embodiment of the present invention. The preferred signature capture pad 10 is designed to be used in conjunction with other POS equipment (see FIGS. 2A–2B). This POS equipment may include cash registers, credit card terminals, receipt printers, and other equipment operative to record numeric data associated with a financial transaction. The signature capture pad 10 includes a digitizer that provides digital signature signals corresponding to a signature obtained in conjunction with a financial transaction, such as a credit card transaction. The signature signals (which include uncompressed digitized signature signals or compressed signature signals) are transmitted to the POS equipment by means of the signature pad cable 15, which is connected to one of two serial ports (not shown) on the signature capture pad 10. The serial ports are bidirectional and are operative in the manner described herein to allow connection to existing POS terminals and/or other peripheral devices. The signature signals are associated with numeric transaction data at the POS equipment. Various system configurations in which the signature capture pad 10 may be used are discussed below in conjunction with FIGS. 2A–2B.

The signature capture pad 10 includes a housing having a top portion 20 and a bottom portion 25. The preferred signature capture pad 10 employs an electromagnetic digitizer which is not visible from the outside of the housing. Therefore, an alignment guide 30 is provided so that a receipt 35 may be positioned properly above the active area of the digitizer. The active area is defined as the region in which the digitizer can accurately digitize a signature. The receipt 35 is positioned properly when the signature line 40 is located within the area defined by the rectangular opening of the alignment guide 30. The operation of the digitizer is discussed below in conjunction with FIG. 8.

The stylus 45 is used to sign the receipt 35, which is printed by a separate printer (not shown). In addition to a ball point pen refill, the stylus includes electronic circuitry and forms a part of the digitizer circuit. The stylus 45 is connected to the signature capture pad 10 by means of stylus cable 50. When the stylus 45 is not in use, it may be stored in the recessed stylus receptacle 55.

Figure 2A:
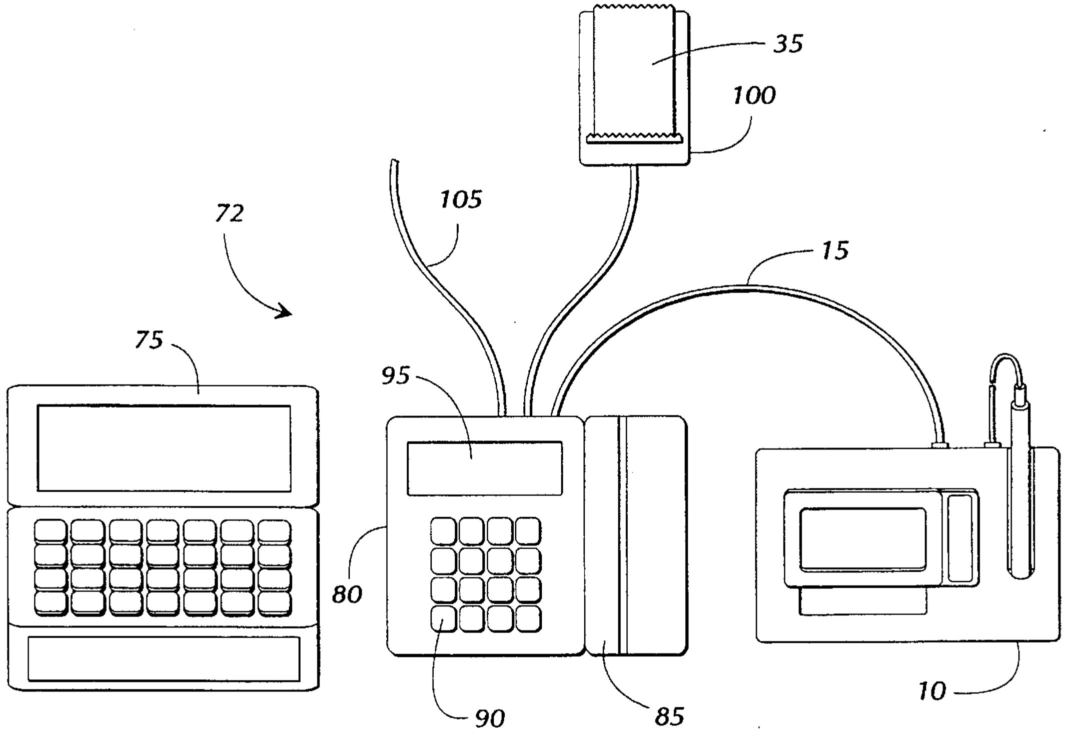
FIGS. 2A–2B are block diagrams illustrating various system configurations in which the signature capture pad of FIG. 1 may be used.
Figure 2B:
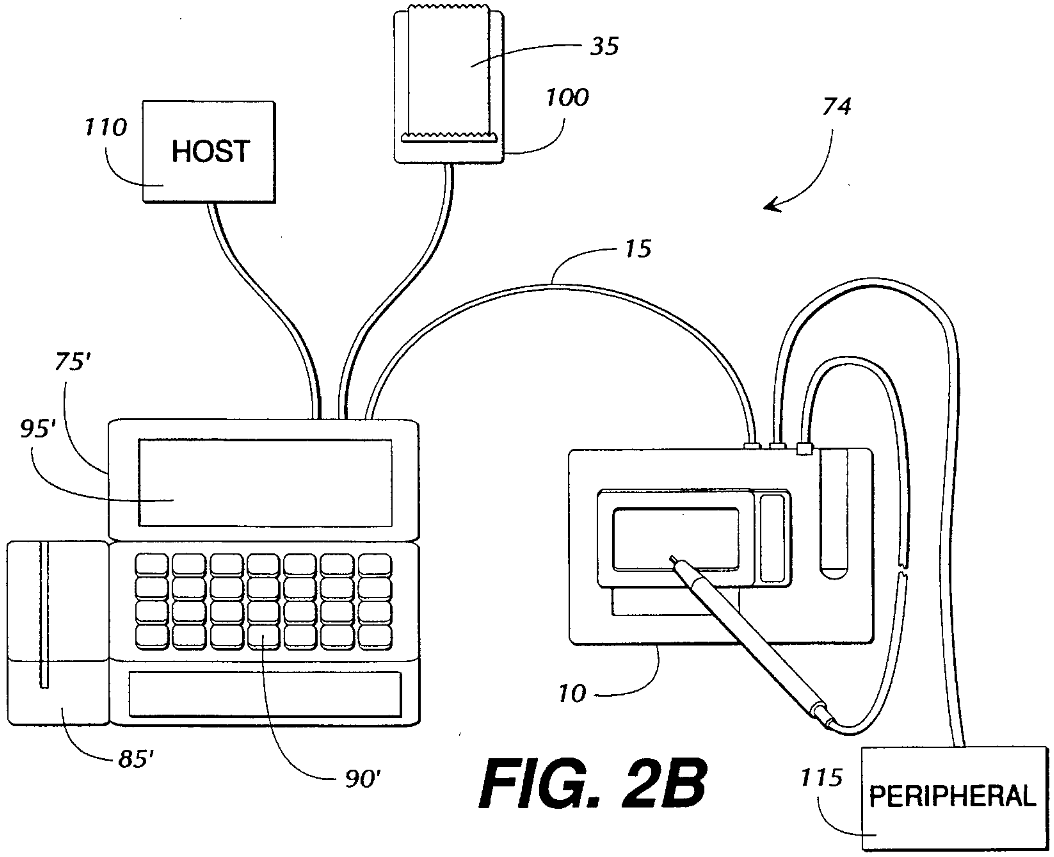

By using the serial ports (shown below in FIGS. 5, 6, and 8) for data communications, the signature capture pad 10 provides signature capture capabilities that may be used in conjunction with a merchant's existing POS equipment. FIGS. 2A–2B illustrate exemplary systems in which the signature capture pad 10 may be used. Those skilled in the art will understand that the hardware configurations described in conjunction with FIGS. 2A–2B are provided for purposes of illustration only and are in no way intended to limit the types of systems in which the preferred signature capture pad. 10 may be used.

FIG. 2A illustrates a POS system 72, in which a signature capture pad 10 is added to an existing POS system that includes a cash register 75 and an independent credit card transaction terminal 80. In such a system, the cash register is operative to provide a purchase amount based on the goods or services purchased. The credit card transaction terminal includes an input device for obtaining numeric data, such as magnetic stripe reader 85, which reads account data directly from a credit card's magnetic stripe. The credit card transaction terminal 80 also includes an input device, such as keypad 90, and an output device, such as display 95. The terminal also is connected to a secondary output device, such as receipt printer 100. The terminal is connected to a remote credit card processor (not shown) by a telephone line 105 and to the signature capture pad 10 by signature pad cable 15.

Generally, the credit card account data is read automatically from a customer's credit card by the magnetic stripe reader 85. The purchase price is displayed on the cash register and manually entered into the credit card transaction terminal 80 via keypad 90. Once the numeric data is collected, the credit card terminal causes the printer 100 to print a receipt 35 containing the numeric transaction data and a line for the customer's signature. The receipt is removed from the printer and signed by the customer on the signature capture pad 10. The signature signals (which may consist of uncompressed digitized signature signals or compressed signature signals) from the signature capture pad 10 are provided to the credit card transaction terminal 80 by means of signature pad cable 15. At that point, the signature signals are associated with the numeric transaction data to form a transaction data packet, which is provided to a remote credit card processor by means of telephone line 105 or other communications means.

Prior to the completion of the transaction, the terminal 80 may cause the printer 100 to print a facsimile signature corresponding to the signature signals received from the signature capture pad 10. The merchant may determine whether the facsimile signature corresponds to the authorized signature on the back of the credit card. The facsimile signature also allows the merchant to determine whether the quality of the digitized signature is acceptable. If the facsimile signature is acceptable, the transaction is completed in the manner described above. If not, the transaction may be terminated, or the customer may be asked to re-sign the receipt.

FIG. 2B illustrates a more sophisticated POS system 72' in which a terminal such as an electronic cash register 75' is connected to a host system 110. For purposes of the present invention, the host system may be a remote credit card processor that receives transaction data via telephone lines or it may be a local host computer or in-store processor that ties together a number of electronic cash registers 75'. When connected to an in-store processor, the transaction data provided by the electronic cash registers may be used to facilitate the business's inventory and accounting functions. The in-store processor may forward credit card transaction data to a remote credit card processor via telephone or other communications means.

In the system of FIG. 2B, the electronic cash register 75' includes an input device, such as keypad 90', an output device, such as display 95', and a magnetic stripe reader 85'. The cash register 75' is connected directly to two (2) peripheral devices by means of serial communications ports. One such peripheral device is a secondary output device, such as receipt printer 100, which is operative to receive transaction data from the electronic cash register 75' and print a receipt 35 containing said data. The electronic cash register 75' also is connected to signature capture pad 10 via signature pad cable 15. After a receipt is printed by printer 100, the receipt is removed from the printer, positioned on the signature capture pad 10, and signed by the customer. The signature signals are provided to the electronic cash register 75', where they are associated with the numeric transaction data to form a transaction data packet. This data packet is then communicated to the host system 110.

As discussed above in connection with FIG. 2A, the electronic cash register 75' may cause the printer 100 to print a facsimile signature corresponding to the signature signals provided by the signature capture pad 10. In addition, the electronic cash register 75' also may cause a facsimile signature to be displayed on the display 95'. In either case, the merchant may verify that the facsimile signature is acceptable, and thereafter complete or terminate the transaction.

FIG. 2B also illustrates an additional peripheral device 115 connected to the second serial communications port on the signature capture pad 10. In this configuration, the signature capture pad 10 operates as a router, or as a device known to those skilled in the an as a keyboard wedge product, serial port expander, or multiplexer. The concepts underlying the operation of a wedge product are described in U.S. Pat. No. 5,179,375 to Dick et al., which is incorporated herein by reference. The signature capture pad 10 is operative to respond to data from the electronic cash register 75' intended for it, and pass through data traveling between the electronic cash register 75' and the peripheral device 115. The details of these communications capabilities are described below in conjunction with FIGS. 8 and 11.

The signature capture pad's routing capabilities allow the signature capture pad 10 to be added to a POS system that formerly consisted of the electronic cash register 75', printer

100, and peripheral device 115. By being able to connect the signature capture pad 10 to the electronic cash register 75' and the peripheral device 115 to the signature capture pad 10, the signature capture pad 10 may be added to the POS system without requiring the merchant to replace the peripheral device with the signature capture pad. The peripheral device 115 may consist of a variety of serial devices for obtaining numeric data associated with a transaction, including a magnetic stripe reader, PIN pad, or magnetic ink character recognition (MICR) check reader. Although the system of FIG. 2B describes an electronic cash register 75' having two serial ports and connected to a separate printer 100, the present inventors also contemplate a system in which the electronic cash register has more than two (2) serial ports and includes a built-in printer.

Figure 3:
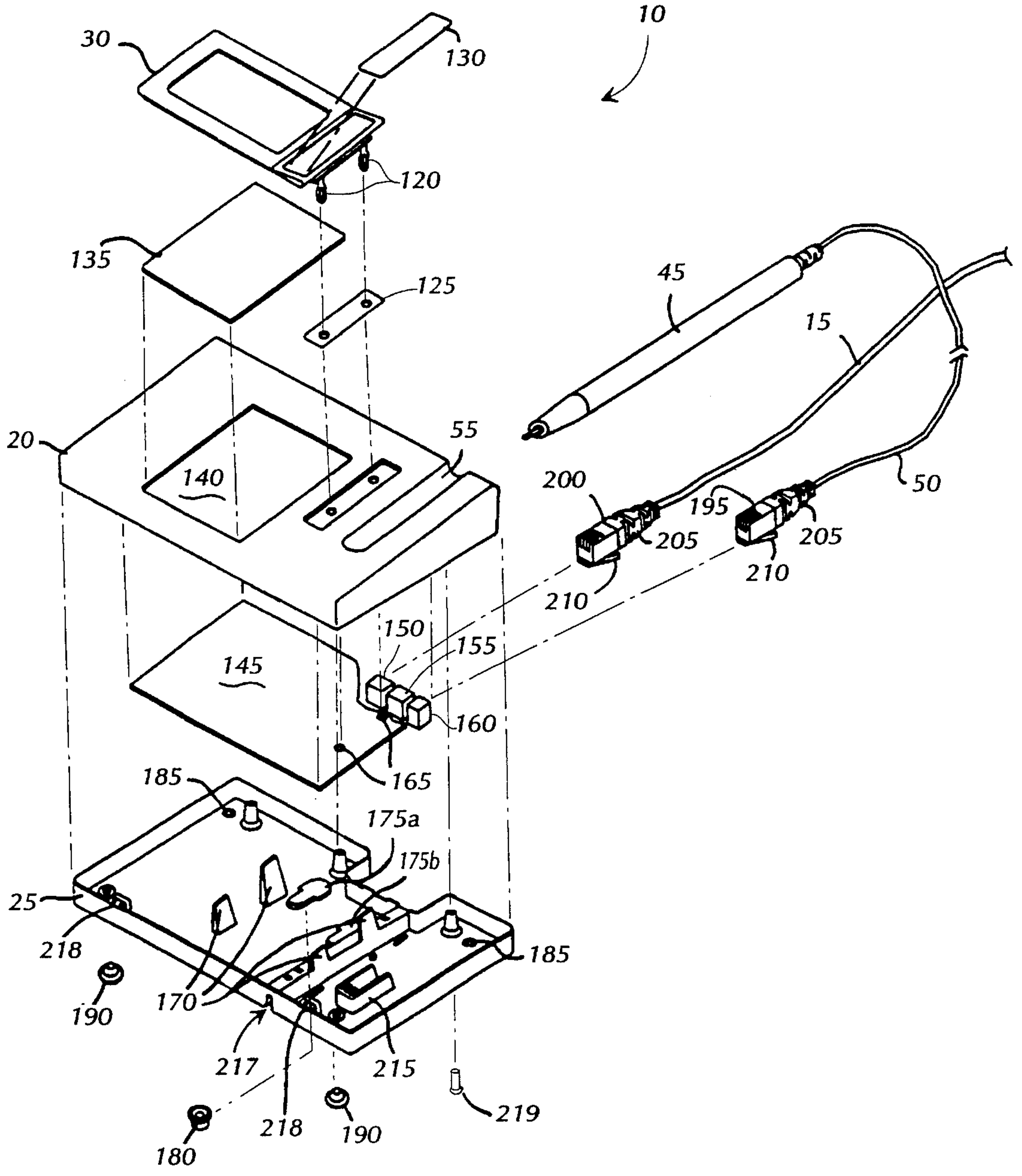
FIG. 3 is an exploded perspective view of the signature capture pad of FIG. 1.

FIG. 3 is an exploded perspective view of the preferred signature capture pad 10. In addition to the major subassemblies, FIG. 3 illustrates a variety of features that facilitate the assembly of the signature capture pad and result in a device having a relatively low cost. As described above, the signature capture pad 10 includes a housing having a top portion 20 and a bottom portion 25. A stylus receptacle 55 is formed in the housing top portion 20. An alignment guide 30 is attached to the housing top portion 20 by means of nylon or plastic fastening pins 120. The pins 120 extend through a gasket 125, which protects the interior of the signature capture pad from spills and moisture. A name plate 130 may be printed with a logo or instructions and attached to the alignment guide 30.

A piece of urethane material 135 is positioned between the alignment guide 30 and the housing top portion 20. The urethane material 135 is generally rectangular in shape and is accommodated by recessed area 140. The urethane material has a high coefficient of friction and is provided in order to reduce a receipt's tendency to slip when it placed on the signature capture pad. The urethane material extends beyond the edge of the alignment guide so that any portion of the receipt that comes in contact with a person's hand also would be in contact with the urethane material 135, and would be less likely to slide as a result. The spacing between the alignment guide 30 and urethane material 135 is such that it easily accommodates receipts or forms consisting of 2 or 3 plys.

A single printed circuit board (PCB) 145 is mounted in the interior cavity formed by the housing top and bottom portions. The PCB 145 includes all of the electronic components necessary to implement the digitizer and communications functions found in the signature capture pad. The PCB includes three RJ-11-type connectors 150, 155, 160 that allow the signature capture pad to be connected to the stylus 45 and to other POS equipment. Additional details regarding the PCB and the serial connectors are provided below in conjunction with FIGS. 5–8.

Those skilled in the art will appreciate that a PCB including an electromagnetic digitizer may not be mounted using metal screws. In addition, nylon and other non-metallic screws are known to break during use. In the preferred signature capture pad 10, the PCB 145 is mounted to the interior of the housing top portion 20 without screws or adhesives. The fastening pins 120 extend through the housing top portion 20, and through mounting holes 165 formed in the PCB 145. The diameter of the fastening pins 120 and mounting holes 165 are such that the PCB is held securely by the fastening pins. Once the signature capture pad is assembled, the PCB also is retained against the interior of the housing top portion by means of support tabs 170, which extend upwardly from the interior of the housing bottom portion 25 and contact the bottom surface of the PCB 145.

FIG. 3 also illustrates various features incorporated into the housing bottom portion 25. In addition to the PCB support tabs 170, the bottom portion 25 includes two swivel base connectors **175*a*, 175*b* that allow the signature capture pad to be connected to a swivel base (not shown) for easy rotation about its vertical axis. Swivel base connector 175*a* is located in the center of the signature capture pad 10. The present inventors also provide a second swivel base connector 175*b* for use when the signature capture pad is attached to a PIN pad or other devise (see FIG. 9). Swivel base connector 175*b* is located in the center of the combined signature capture/PIN pad configuration illustrated in FIG. 9. The swivel bushing 180** is inserted into the proper swivel base connector and connected to the mounting surface.

The signature capture pad has four feet located at the corners of the housing. The rear feet 185 are molded into the housing bottom portion 25. The front feet 190 are robber and are inserted into holes in the housing bottom portion during assembly. The use of molded feet reduces the assembly time and cost of the device. However, rubber feet are necessary to provide the friction necessary to prevent the signature capture pad from sliding while a person is signing a receipt. Consequently, the pressure exerted on the front feet by the hand of a person signing a receipt is sufficient to prevent the signature capture pad 10 from sliding.

The stylus 45 is connected to the signature capture pad 10 by stylus cable 50. The stylus cable 50 is terminated with an RJ-11 4 position jack 195. The jack 195 plugs into stylus port 160, which is mounted on the bottom of PCB 145. FIG. 3 also illustrates signature pad cable 15, which is terminated with an RJ-11 6 position jack 200. The jack 200 plugs into host serial port 150. Both RJ-11 type jacks 195,200 include a strain relief 205 and a release tab 210, which is operative to retain the plug in the socket in the manner known to those skilled in the art.

The stylus receptacle 55 is designed to accomplish several objectives. The receptacle is in the form of a deep trough. The depth of the receptacle is greater than the diameter of the stylus. This allows the stylus to be retained in a position that is lower than the top surface of the signature capture pad 10. As a result, it is possible to place papers or small packages on the signature capture pad without them coming into contact with or dislodging the stylus. Although the stylus is securely retained, the length of the stylus receptacle 55 allows the stylus 45 to be removed from the receptacle by lifting straight up on the exposed end of the stylus. Thus, the stylus 45 is safely retained in the receptacle, but easily removed by a customer.

In addition, the stylus receptacle 55 is positioned to the right of the alignment guide 30 to ensure that the stylus receptacle is not covered by a receipt or form after the receipt is positioned properly on the signature capture pad 10. Thus, the stylus 45 will be readily accessible to the customer after the merchant has placed the receipt 35 on the signature capture pad 10.

As described more completely below, the stylus 45 includes a pressure sensitive switch that indicates when the stylus is in contact with a surface. In order to prevent this switch from being closed while the stylus 45 is in the receptacle 55, a stylus support 215 is molded into the housing bottom portion 25. The end of the trough opens into the interior of the signature capture pad so that the tip of the stylus 45 engages the stylus support 215. The operation of the stylus support is described more completely in conjunction with FIG. 4.

The housing bottom portion 25 is molded so that a rectangular cord channel 217 is formed along the exterior surface. The cord channel 217 allows the stylus cable 50 to be securely routed under the signature capture pad 10 so that it extends from the front of the signature capture pad instead of from the rear, where the stylus connector 160 is located.

The housing bottom portion 25 and housing top portion 20 are fastened together along the front by means of molded plastic clips 218. The rear portion of the signature pad is fastened together by screws 219, which extend up through the bottom portion 25 into the top portion 20.

Figure 4:
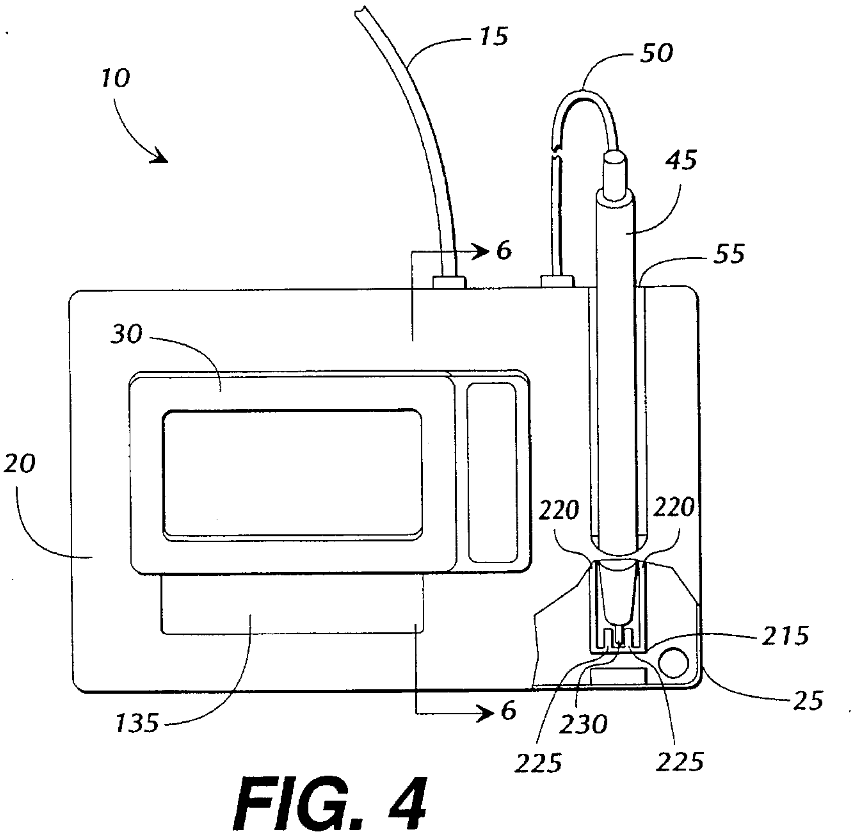
FIG. 4 is a top view of the signature capture pad of FIG. 1, with a portion of the top cover cut away to reveal the position of the stylus.

FIG. 4 is a top view of the signature capture pad 10, with a portion of the lower right corner cut away to reveal the relationship between the stylus 45 and the stylus support 215. This view clearly illustrates the relationship between the alignment guide 30 and the urethane material 135. The urethane material 135 is larger than the signature area defined by the alignment guide 30 in order to provide additional surface contact with a receipt and thereby minimize slippage during signing. The stylus 45 is connected to the signature capture pad 10 via stylus cable 50, which plugs into a connector located on the back of the signature capture pad. The signature pad cable 15 also plugs into a connector located on the back of the device.

When the stylus is placed in the stylus 45 receptacle 55, the tip of the stylus extends into the interior portion of the signature capture pad, and encounters the stylus support 215. The stylus support includes two short parallel interior walls 225 and two longer parallel exterior walls 220. The distance between the interior walls is greater than the pen tip 230, but smaller than the diameter of the stylus barrel. The stylus is positioned between exterior walls 220 of the stylus support 215. The end of the stylus rests against the ends of the interior walls 225, and prevents the tip 230 of the pen from coming into contact with anything that would cause the tip to be depressed, and thereby activate the switch. The operation of the switch is discussed more completely below in conjunction with FIG. 8.

Figure 5:
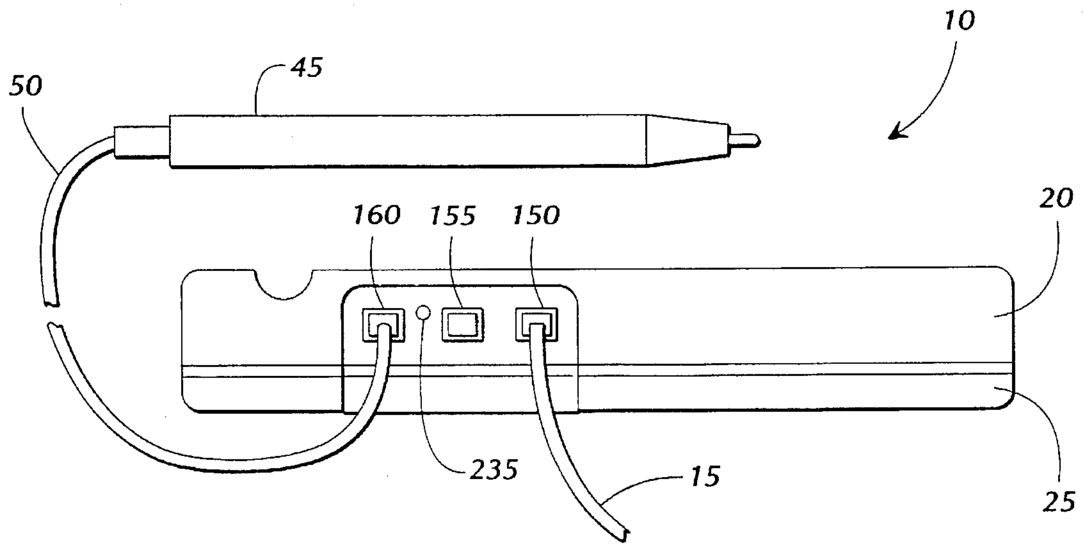
FIG. 5 is a rear view of the signature capture pad of FIG.

FIG. 5 is a rear view of the preferred signature capture pad 10, and clearly shows the connectors discussed above. The host serial port 150 is a 6-position RJ-11-type modular connector into which the signature pad cable 15 is inserted. The peripheral serial port 155 is a 6-position RJ-11-type modular connector and is used to connect the signature capture pad 10 to another peripheral device when the signature capture pad is used as a wedge product. The stylus cable 50 plugs into the stylus port 160, which is a 4-position RJ-11-type modular connector.

FIG. 5 also illustrates the status light emitting diode (LED) 235. The LED is mounted on the PCB 145 and is controlled by the signature capture pad electronics. In the preferred signature capture pad, the LED will provide an indication of the status of the signature capture pad. A blinking LED will indicate that the signature capture pad is functioning properly. If the LED is off, signature capture pad is not receiving power. If the LED is on but not blinking, the signature capture pad has power, but is not operational.

Figure 6:
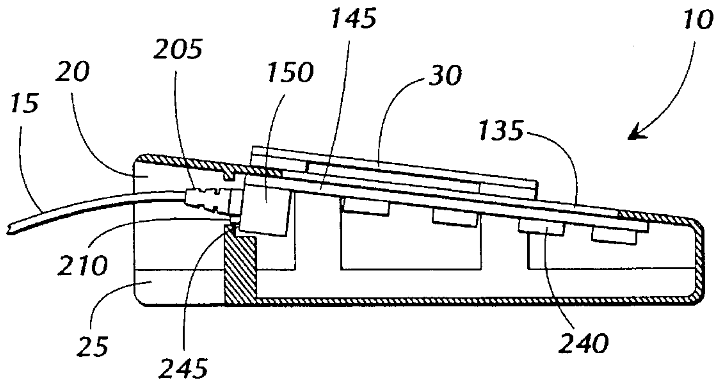
FIG. 6 is a cross-sectional view of the signature capture pad of FIG. 1, taken along the line 6—6 of FIG. 4.

FIG. 6 is a cross-sectional view of the signature capture pad 10 taken along the line 6–6 of FIG. 4. FIG. 6 illustrates the mounting position of the PCB 145. The PCB 145 is a multi-layer printed circuit board. It does not have any components mounted on its top surface and is mounted flush against the interior of the housing top portion 20. The serial port connectors, a variety of integrated circuits 240, and other electronic devices are mounted on the bottom surface of the PCB 145 The alignment guide 30 and urethane material 135 are positioned over the PCB 145.

The cross-sectional view of FIG. 6 also illustrates the preferred means for preventing the unauthorized release or removal of the RJ-11connectors. Those skilled in the art will appreciate that RJ-11-type connectors are easily removed if the release tabs 210 are accessible. In order to prevent the connectors from being removed easily, the signature capture pad incorporates a ledge 245, which is a part of the housing bottom portion 25. The ledge 245 extends outward beyond the release tab and prevents a person from actuating the release tab with his fingers. The release tabs 210 may be actuated by a small flat blade screwdriver or similar tool (not shown). In this manner, the signature capture pad provides positive lock for the RJ-11connectors, and the disconnection and theft of the stylus 45 and other cables is deterred.

FIG. 6 also reveals the nature of the recessed area in which the connectors are located. By recessing the connectors from the rear surface, the preferred signature pad is able to accommodate cables having larger, sturdier strain relief elements 205, without causing the cables to extend beyond the footprint of the signature pad.

Figure 7:
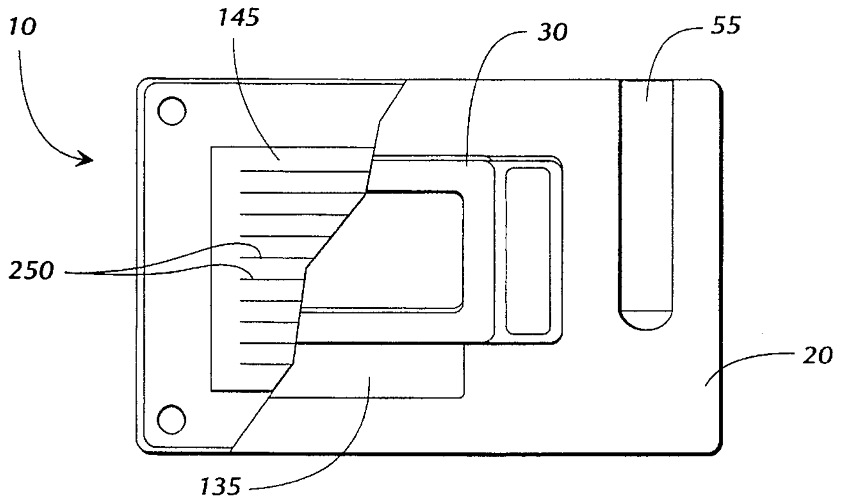
FIG. 7 is a top view of the signature capture pad of FIG. 1, with a portion of the top cover cut away to reveal the position of the printed circuit board.

FIG. 7 is a top view of the signature capture pad 10, with a portion of the housing top portion 20 cut away to reveal the position of the printed circuit board 145. The top layer of the PCB 145 includes horizontal traces 250 that form a portion of the digitizer grid. A second layer includes vertical grid traces. Other interior layers provides shielding and traces for interconnecting the devices mounted on the bottom surface in a manner familiar to those skilled in the art.

Figure 8:
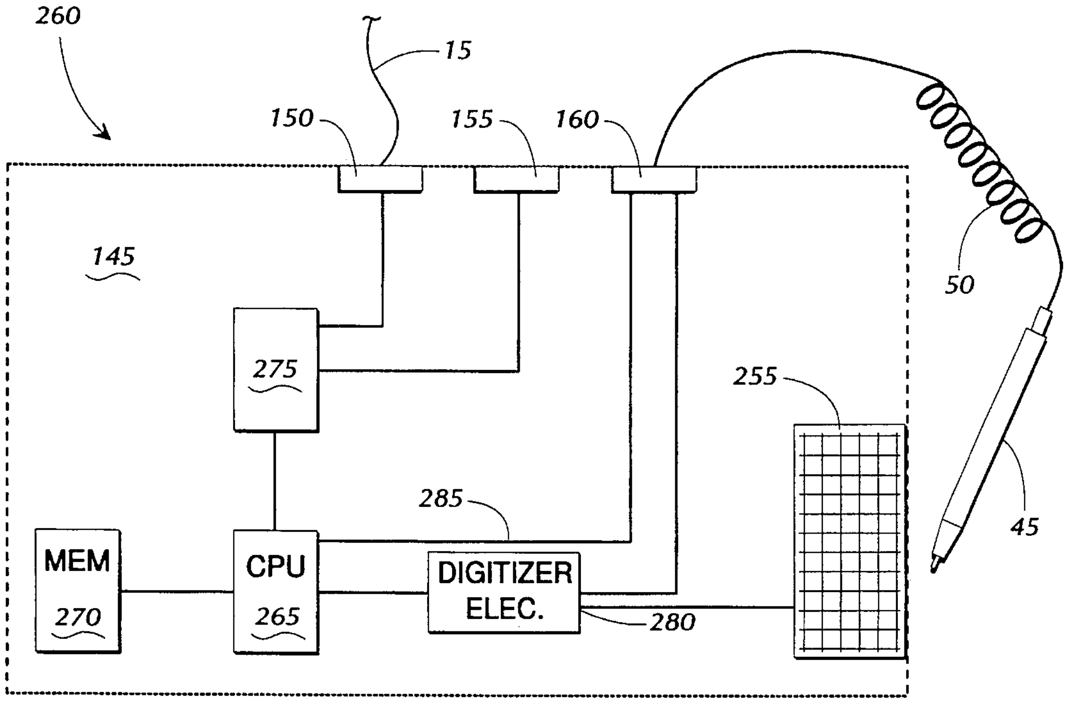
FIG. 8 is a block diagrammatic representation of the electronic circuitry employed in the preferred signature capture pad.

FIG. 8 is a block diagrammatic representation of the electronic circuitry 260 employed in the signature capture pad 10. With the exception of the stylus 45 and stylus cable 50, the circuitry 260 is implemented entirely on the printed circuit board 145.

The circuitry 260 includes a central processing unit ("CPU") 265. The preferred CPU 265 is a type 80C32 microprocessor manufactured by Philips Semiconductor (formerly Signetics), Sunnyvale, Calif. The CPU 265 includes 8K bytes of internal ROM for program storage, and is connected to 32K bytes of external static RAM 270 for data storage. The CPU 265 also is connected to analog serial port circuitry 275 that is used to drive the host serial port 150, which is connected to a host system via signature pad cable 15, and peripheral serial port 155. As described above, these serial ports are bidirectional serial ports used to communicate with other serial devices. The communications protocols are controlled by the CPU 265.

Those skilled in the art will appreciate that the serial ports 150,155 can be implemented in a six-pin RJ-11-type connector that includes the following signals:

| Signal | Direction | Function |
|---|---|---|
| PWR | input | providing a dc voltage to the signature capture pad |
| GND | input | providing signal ground for the signature capture pad |
| CTS | input | indicates signature capture pad may transmit data to host |
| RTS | output | indicates host may transmit data to signature capture pad |
| Tx Data | output | transmit data port |
| Rx Data | input | receive data port |

The signature capture pad serial port settings are 9600 baud, 1 start bit, 8 data bits, no parity, and 1 stop bit. The preferred signature pad allows a maximum delay between incoming characters of 100 milliseconds. The signature capture pad resynchronizes itself automatically upon the receipt of an incoming escape character.

In the compressed signature capture mode (discussed below), the signature capture pad performs hardware flow control by using RTS and CTS handshaking. The signature capture pad will hold its RTS output high when it can accept data and will lower its RTS when it is busy. The signature capture pad will only transmit compressed signature data to the host system if the CTS input is high. The signature capture pad ignores flow control when it is sending uncompressed signature data to the host system.

The circuitry 260 also includes the components necessary to implement the digitizer. These include the digitizer grid 255, digitizer electronics 280, stylus 45 and stylus cable 50. The digitizer grid includes X- and Y-grids. The digitizer electronics 280 includes an analog-to-digital converter and other circuitry for amplifying and conditioning the signals received from the stylus 45. The preferred analog-to-digital converter is a type ADC0841, manufactured by National Semiconductor, Santa Clara, Calif.

The digitizer operates in the manner described in U.S. Pat. No. 3,873,770 to Ioannou, which is incorporated herein by reference and made a part hereof. The digitizer provides data corresponding to the (X,Y) coordinate pairs that are representative of the signature provided by the cardholder. The preferred digitizer comprises 15 horizontal grid wires and 24 vertical grid wires. The CPU 265 causes the stylus to emit a continuous signal, which generates a low intensity magnetic field. When the pen is close enough to the digitizer grid 255, the magnetic field induces an electric current in the grid. This induced electric current is detected by the CPU.

The elements of the X and Y grids are sampled in a sequential manner as the stylus is used to sign the receipt. As the energized stylus is used in the vicinity of the grids, an electric current is induced in each of the grid wires. This analog signal is amplified, conditioned, and digitized by the digitizer electronics 280. The digitized signal is then supplied to the CPU 265, which is operative to derive X and Y coordinate data from the induced signal. Because an electromagnetic digitizer relies on signals transmitted by the stylus and received by the grid wires, the digitizer is not sensitive to pressure from fingers or other objects that come into contact with the digitizer. Likewise, the digitizer will work with thick multi-part forms and over plastic clips, clipboards, etc.

The CPU is programmed to sample each grid wire and measure the signal induced by the stylus. It samples each wire in rapid sequence and stores each response from the grid in a memory array corresponding to the coordinates of the window. By interpreting the stored data (which varies in magnitude based on the distance between the stylus and the sampled grid) and performing mathematical calculations on it, the CPU can pinpoint the location of the stylus to a resolution better than 0.001 inches.

Those skilled in the art will understand that electromagnetic digitizers also may be set up so that the grid wires are pulsed and the stylus acts as an antenna. In this manner, the signals received by the stylus are sampled and interpreted to provide the stylus position. Although either method is acceptable, the present inventors believe the method wherein the stylus acts as a transmitter and the grid as the received provides better immunity from noise and other interference induced by other POS terminal equipment.

The "report rate", which is indicated in reports per second ("rps"), indicates the frequency with which the digitizer determines the position of the stylus. Each report requires the CPU to sample each grid wire and interpret the signals received from them. The report rate depends on the filter parameters (for both digital and analog filters) applied to the sampled data. In the preferred signature capture pad 10, the report rate is approximately 110 rps.

A pressure sensitive switch within the stylus 45 (not shown) generates a CONTACT signal on line 285. The CONTACT signal is asserted when the stylus comes into contact with the receipt 35 and is negated when the stylus is lifted from the receipt.

Once the digitizer CPU 265 creates the signature signals representative of the signature, the CPU 265 transmits the data to the cash register or terminal connected to host serial port 150. The data is provided in a format determined by the user. These formats may include (X,Y) coordinate pairs provided at predetermined sample times, or compressed data at a user-selectable resolution. Those skilled in the art will appreciate that the process of compressing the data reduces the amount of memory required to store the signature. The preferred method by which the signature signals are compressed and decompressed by the signature capture pad is described in the abovereferenced signature capture terminal application.

In the preferred embodiment of the present invention, the preferred digitizer active area measures 4.0 inches by 2.25 inches. At the default resolution of 300 dots per inch (dpi), this provides 1200 pixels arranged in the X direction, and 675 pixels arranged in the Y direction. It will be appreciated that the signature capture pad is operative to capture signatures provided anywhere in the active area even though the aperture defined by the rectangular alignment guide 30 is smaller than the active area.

Figure 9:
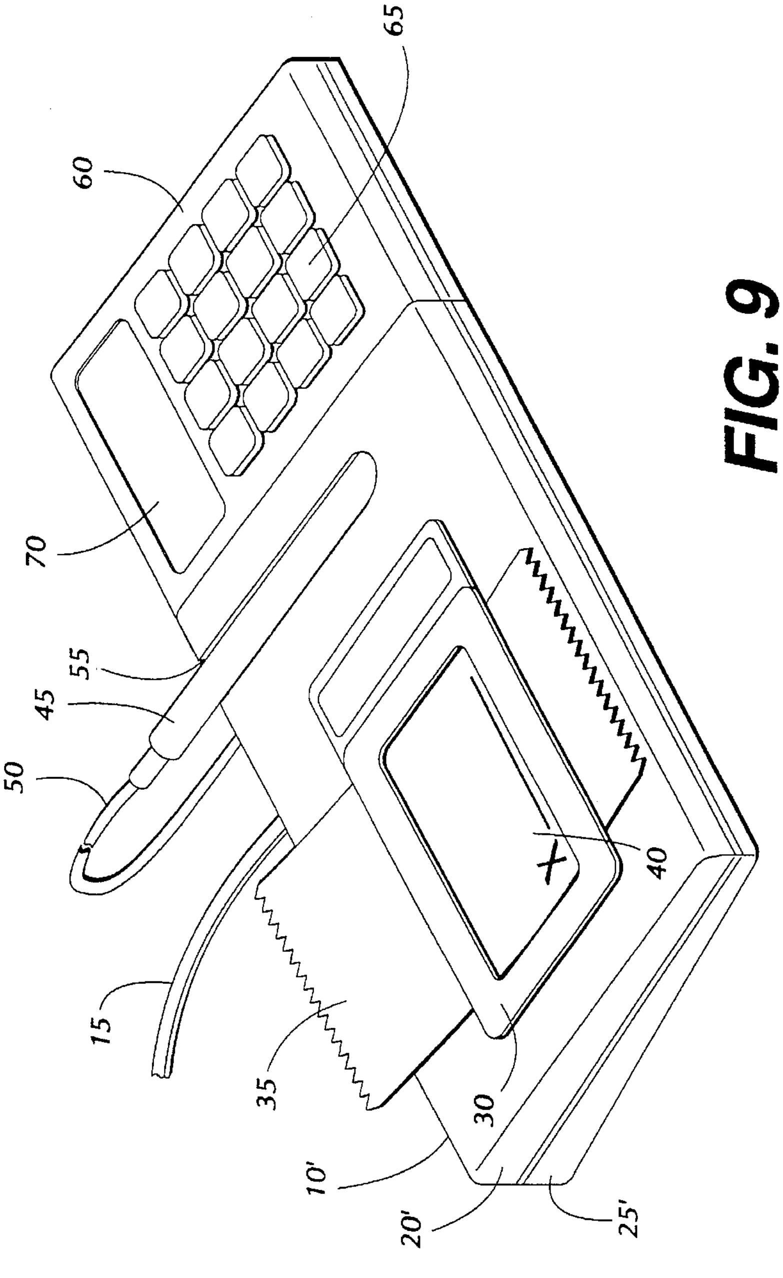
FIG. 9 is a perspective view of a signature capture/PIN pad constructed in accordance with an alternative preferred embodiment of the present invention.

FIG. 9 shows a signature capture/PIN pad 10' constructed in accordance with an alternative preferred embodiment of the present invention. Generally described, the signature capture/PIN pad 10' includes a signature capture pad as illustrated in FIG. 1 and a PIN pad 60 that allows a customer to enter numeric data, such as a personal identification number (PIN). A PIN typically is required when goods or services are paid for using a debit card. The signature capture/PIN pad 10' is operative to provide signature data and PIN data to connected POS equipment.

Like the signature capture pad 10, the signature capture/PIN pad 10' is connected to POS equipment by a signature pad cable 15, and includes a housing having top and bottom portions 20', 25'. The signature capture/PIN pad 10' also includes an alignment guide 30, which allows the receipt 35 to be positioned so signature line 40 is located above the digitizer's active area. The stylus 45 is connected to the signature capture/PIN pad 10' via stylus cable 50, and may be stored in the stylus receptacle 55.

The PIN pad 60 includes a keypad 65 and display 70. The display 70 is operative to display instructions to the customer regarding the entry of his PIN. The customer will then use the keypad 65 to enter his PIN.

The present inventors contemplate that the PIN pad 60 may be any of several different types. For example, the PIN pad 60 may be a "smart" device having a microprocessor and serial communications ports capable of being connected to a variety of POS equipment. In such a case, the PIN pad 60 can be mounted to a signature capture pad 10 and connected to one of the serial ports on the signature capture pad 10. The signature capture pad's input/output capabilities are discussed more completely below in conjunction with FIGS. 9 and 10.

Alternatively, the PIN pad 60 may be a "dumb" device without a microprocessor or serial communications capabilities. In this case, the PIN pad 60 would include only a keypad 65 and display 70, which would be driven directly by the electronics in the signature capture pad 10. Such a device may be included in at the factory, or may be an after-market item that is added to a signature capture pad 10 in order to provide PIN capabilities.

Figure 10B:
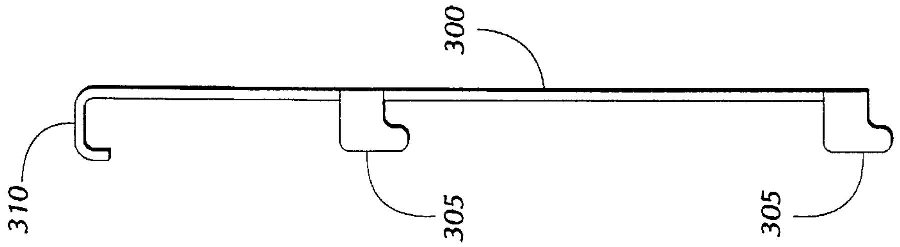
FIGS. 10A–10C are top, right, and front plan views, respectively, of a bracket for connecting a PIN pad to the signature capture pad of FIG. 1.
Figure 10A:
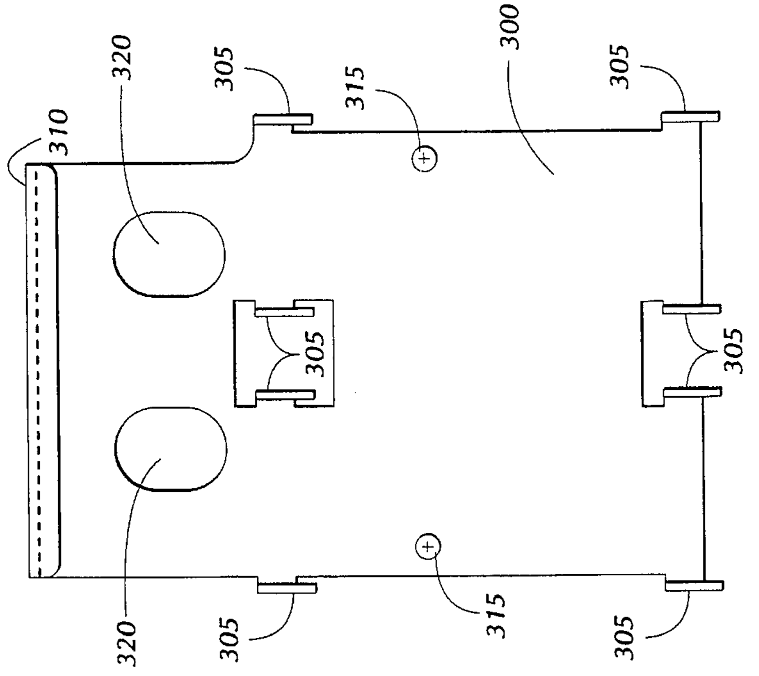
Figure 10C:
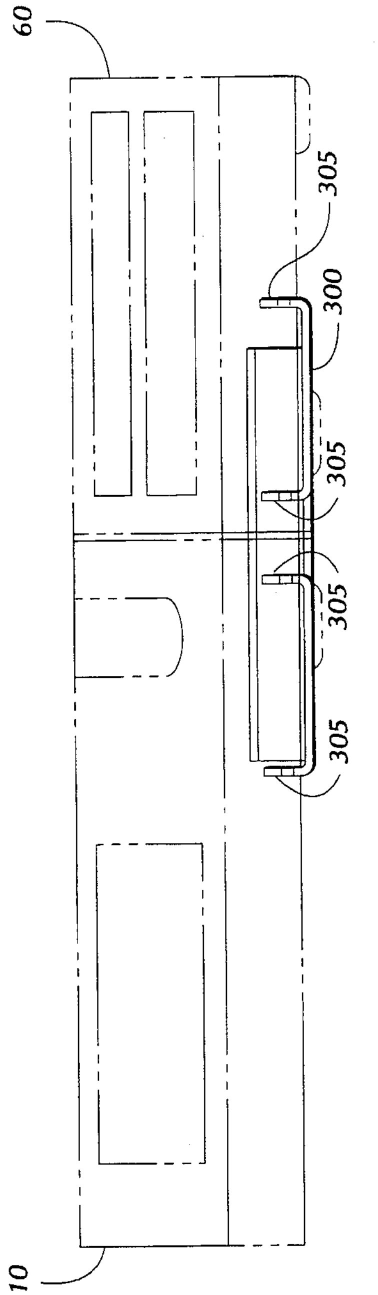

Turning now to FIGS. 10A–10C, the preferred bracket 300 for connecting a signature capture pad 10 to a PIN pad will be described. FIGS. 10A–10C are top, right, and front plan views, respectively. In FIG. 10C, the signature capture pad 10 and PIN pad 60 are shown in phantom. The bracket 300 is a basically flat piece of metal or plastic having eight (8) L-shaped tabs 305 extending vertically therefrom. The bracket 300 also includes a U-shaped channel 310 formed on one end.

The bracket 300 is installed by inserting four of the tabs 305 through slots provided in the bottom of the signature capture pad 10. The signature capture pad is then moved toward the U-shaped end of the clip so that the L-shaped tabs 305 engage the bottom surface of the signature capture pad. Once the bracket 300 and signature capture pad are positioned properly, a screw (not shown) is inserted through the hole 315 and an aligned hole provided in the bottom of the signature capture pad 10. The PIN pad 60 is attached in a similar manner.

The oblong holes 320 are provided so that the feet formed on the bottom of the signature capture pad and PIN pad extend therethrough. The U-shaped channel 310 provides a passageway for the cable connecting the signature capture pad 10 and PIN pad 60. By retaining the cable in the U-shaped channel, the cable is prevented from extending outwardly away from the terminal where it may be damaged.

Figure 11:
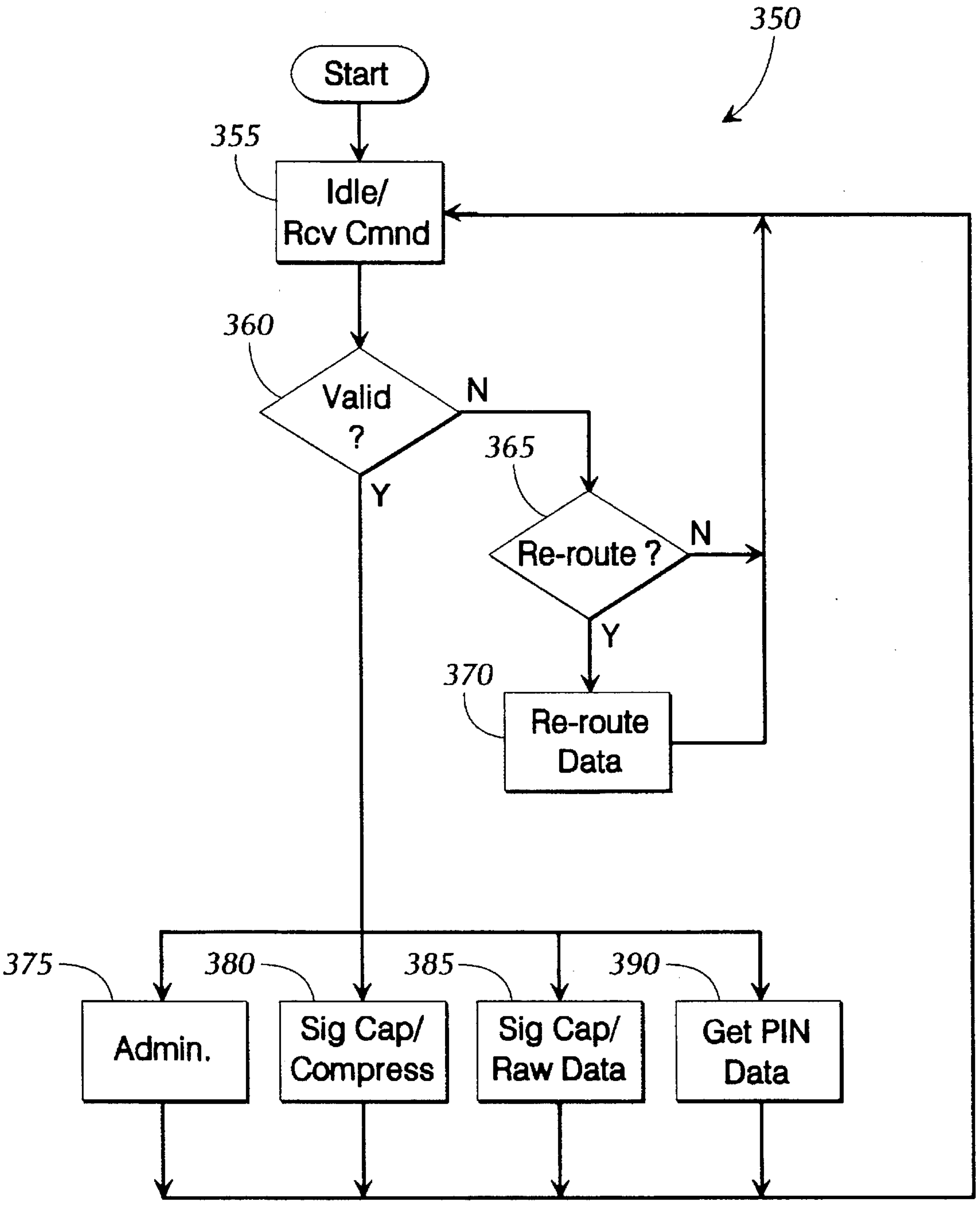
FIG. 11 is a flow diagram illustrating the main loop of the operation of a signature capture pad constructed in accordance with the present invention, implemented as computer software.

Turning now to FIG. 11, the preferred method 350 of operating the signature capture pad 10 and signature capture/PIN pad 10' will be described. This method is implemented as software for the signature capture pad's CPU 265. Generally, the method 350 is operative to receive commands in the form of serial data from a POS host system connected to the host serial port 150 or peripheral serial port 155, and to execute various subroutines responsive to those commands. Inasmuch as the primary function of the capture pad 10 and signature capture/PIN pad 10' is to gather signature data, the subroutines are directed primarily to collecting signature data from the internal digitizer, compressing it (if desired), and transmitting it to the host system. In order to provide context for the operation of the signature capture pad 10 and signature capture/PIN pad 10', certain functions performed by the POS equipment also will be described.

It will be recalled from the previous discussion that the signature capture pad includes a plurality of serial ports 150,155. These serial ports are used to receive data from various sources such as electronic cash registers, PIN pads, and other peripheral devices. The signature capture pad either responds to the data (as when the data comprises a command to the signature capture pad 10) or routes the data to another serial port so that it may be re-transmitted to the its proper destination. The serial communications and routing capabilities of the signature capture pad are described in co-pending U.S. patent application Ser. No. 07/968,967, filed Oct. 30, 1992, entitled "Multi-Reader Transaction Terminal", and assigned to the assignee of the present invention, the disclosure of which is incorporated herein by reference and made a part hereof. (The foregoing application hereinafter will be referred to as the "multi-reader terminal application").

In order to provide versatile serial routing, the signature capture pad 10 is programmed to constantly monitor each of the serial ports for incoming data. When data is received, the signature capture pad 10 responds appropriately, based upon the values of configuration parameters, described below, that are available to customize the serial routing. Each serial port is configured to one of the following five states:

1. Ignore all incoming data—all data received is discarded with no regard to the format and substance of the data.
2. Accept all incoming data as intended for the signature capture pad—data that conforms to valid signature capture pad packet formats will be processed and acted upon accordingly. Data that does not fit into a recognized signature capture pad format will be discarded.
3. Redirect all incoming data except for packets recognizable as intended for signature capture pad—Data that conforms to valid signature capture pad packet formats will be processed and acted upon accordingly. Data that does not fit into a recognized signature capture pad format will be redirected to the designated serial port.
4. Unconditional redirection—Data will be redirected to the designated serial port with no regard to the format and substance of the data.
5. Signature capture pad peripheral format—Data transmitted and received by this serial port will not pass through the serial routing portion of the signature capture pad. Ports of this type will be used by the signature capture pad to interface with external peripherals, such as a PIN pad.

Turning now specifically to FIG. 11, the preferred method 350 begins at step 355 where the signature capture pad 10 is in an idle state, waiting to receive a valid command from POS equipment connected to one of the serial ports. At step 360, the method 350 determines whether the data received at step 355 constitutes a valid signature capture pad command. If so, the signature capture pad 10 executes a corresponding appropriate subroutine in order to provide the data requested by the POS system. Some of the subroutines may require prompting the merchant to perform certain actions, such as "SIGN RECEIPT". Because the signature capture pad 10 does not have any input/output means such as an alphanumeric display or keypad, the signature pad 10 is operative to provide signals to the POS terminal requesting the terminal to display an appropriate message on its display. This would typically be accomplished by means of a display 95' located on an electronic cash register 75' (FIG. 2B).

If, at step 360, the data is determined not to constitute a valid signature capture pad command, the method 350 advances to step 365 and determines whether the data should be re-routed in the manner described above. If so, the method proceeds to step 370 and re-routes the data to the appropriate serial port. From step 370, the method returns to step 355, where it enters the idle state. If, at step 365, the method determines that unrecognized data is not to be re-routed, the method ignores the data, returns to step 355, and again enters the idle state.

In addition to the data collecting functions described below in conjunction with steps 388,385, and 390, the signature capture pad 10 and signature capture/PIN pad 10' may be instructed to perform various administrative routines 375. These include resetting the signature capture pad, providing software version number, and setting various user-selectable signature capture and communications parameters. After the administrative command is executed at step 375, the method 350 returns to step 355. Each of the administrative instructions in described below.

The "Activate Pen/Digitizer" command, also called a "Ready" command or signal, activates the signature pad to enter a signature capture mode and capture a signature.

The "Reset Signature Pad" command causes the signature capture pad 10 or signature capture/PIN pad 10' to perform a soft reset. If the signature capture pad is in the signature capture mode when this command is received, all digitizer data is lost. After reset, the signature pad returns a status byte to the POS system, and enters an idle state.

The "Request Digitizer Status" command causes the signature capture pad 10 and signature capture/PIN pad 10' to respond with a one-byte status message indicating the status of the digitizer. This status byte will also be sent at power-up and when the digitizer is placed in the compressed signature capture mode. The format of the status byte is as follows:

Status Byte: 1 B 1 P H M R S

- S =1=Signature pad in compressed signature mode
- R =1=Signature pad in raw data signature mode
- M =1=Signature pad static RAM failure
- H =1=Other signature pad hardware errors
- P =1=Portable pad
- 1=1=Always a 1
- B =1=Low battery (for portable pad)
- 1=1=Always a 1

It will be noted that the status byte includes bits indicative of whether the signature pad is portable or standard, and if portable, whether the battery is low. This information is utilized in an alternative preferred embodiment of the invention, discussed in greater detail below.

The "Request Software Version Number" command causes the signature pad to return a two-byte software version number.

The "Exit Signature Capture Mode" command causes the signature capture pad 10 and signature capture/PIN pad 10' to exit the signature capture mode. If in the compressed signature capture mode, all data collected to this point will be returned in a compressed format. If in the raw data mode, the signature pad will return to the idle state and return a status byte. If already in the idle state, the pad will still return a status byte. This command will generally be provided in response to manual key entry by a terminal operator, e.g. to signify that the signature pad has captured a signature and that the terminal should proceed to associate the captured signature with other transaction data.

The "Set Digitizer Resolution" command allows the POS system to determine the resolution of the signature capture pad's digitizer. At power up, the default resolution is set to 300 dots per inch (dpi). This command allows the POS system to select resolutions of 75, 150, or 300 dpi. Those skilled in the art will appreciate that the resolution affects the quality of the captured signature and the size of the digitized signature data. Therefore, a user may select a resolution that satisfies his particular requirements.

The "Set Jitter Filter Parameters" command allows the POS system to control the parameters used by the signature pad to filter out noise and pen jitter during signature compression. Because vertical and horizontal lines may be compressed more efficiently than diagonal or jagged lines, the jitter filter is used to "snap" slightly diagonal or jagged lines to vertical or horizontal. The values are used inside the compression algorithm to determine a range of points that will be deemed to be on the vertical or horizontal lines. By using this algorithm to remove non-vertical and non-horizontal elements resulting from bumps, hand movement, and pixel location, the present inventors believe the size of the compressed signature signals may be reduced by approximately 15%. When this command is executed, the signature pad returns an acknowledge byte.

The "Set Maximum Signature Size" allows the POS system to determine the maximum signature size (in bytes) of the signature data provided by the signature pad when in compressed mode. At power up, the default value is 900 bytes. This parameter is selectable in 50 byte increments, up to a maximum size of 2000 bytes. When this command is executed, the signature pad returns an acknowledge byte. Those skilled in the art will appreciate that this command allows the user to select a signature size compatible with the limitations of the POS system.

The "Set Signature Capture Time Out" command allows the POS system to set the time out period associated with a signature termination signal. The signature terminal signal functions as an optional, automatic command to exit the signature capture mode. The user-selectable parameter refers to the period between when the stylus 45 is lifted from the pad and when the signature capture process is terminated. The time is selectable between 0 and approximately 50 seconds. The default period is 3 seconds. If 0 seconds is chosen, the signature pad will ignore the timer and will exit signature capture mode only when the "Exit Signature Capture Mode" (discussed above) is received from the host system. The signature pad returns an acknowledge byte when this command is received.

The administrative routines 375 also include serial port routing routines. The serial port routing routines are operative for configuring the serial ports 150,155, responding to incoming communications on one of the serial ports, determining the present configuration of the serial port on which the data was received, and forwarding the data or acting upon the data, depending upon the serial port configuration. The routing function is described more completely in the above-referenced multi-reader terminal application.

Returning to step 360, if the signature capture pad 10 or signature capture/PIN pad 10' receives an instruction to provide compressed signature data, the method 350 proceeds to step 380, where it executes a "Signature Capture/Compressed Data" subroutine. Generally described, this subroutine is operative to digitize and compress a signature as a cardholder signs a transaction receipt. The process of digitizing the signature is carded out in accordance with the parameters set by instructions from the POS system. Digitized signature signals are collected and compressed until the signature pad receives the "Exit Signature Capture Mode" or the signature termination signal times out. At that point, the compression is completed, and the compressed signature signals are provided to the POS system. After the compressed signature signals are provided to the POS system, the method 350 returns to the idle state at step 355.

If, at step 360, the signature capture pad 10 or signature capture/PIN pad 10' receives an instruction to provide raw (uncompressed) signature data, the method 350 proceeds to step 385, where it executes a "Signature Capture/Raw Data" subroutine. Generally described, this subroutine is operative to digitize a signature as a cardholder signs a transaction receipt. The process of digitizing the signature is carried out in accordance with the parameters set by instructions from the POS system. Digitized signature signals are collected and provided to the POS system until the signature pad receives the "Exit Signature Capture Mode" or the signature termination signal times out. At that point, the method 350 returns to the idle state at step 355.

If, at step 360, the signature capture/PIN pad 10' receives an instruction to collect PIN data, the method 360 proceeds to step 390 and executes a "Get PIN Data" subroutine. At this point, the signature capture/PIN pad 10" attempts to collect the PIN data from the attached PIN pad. Once the data is collected, it is encrypted and transmitted to the POS system, and the method returns to the idle state at step 355.

Figure 12:
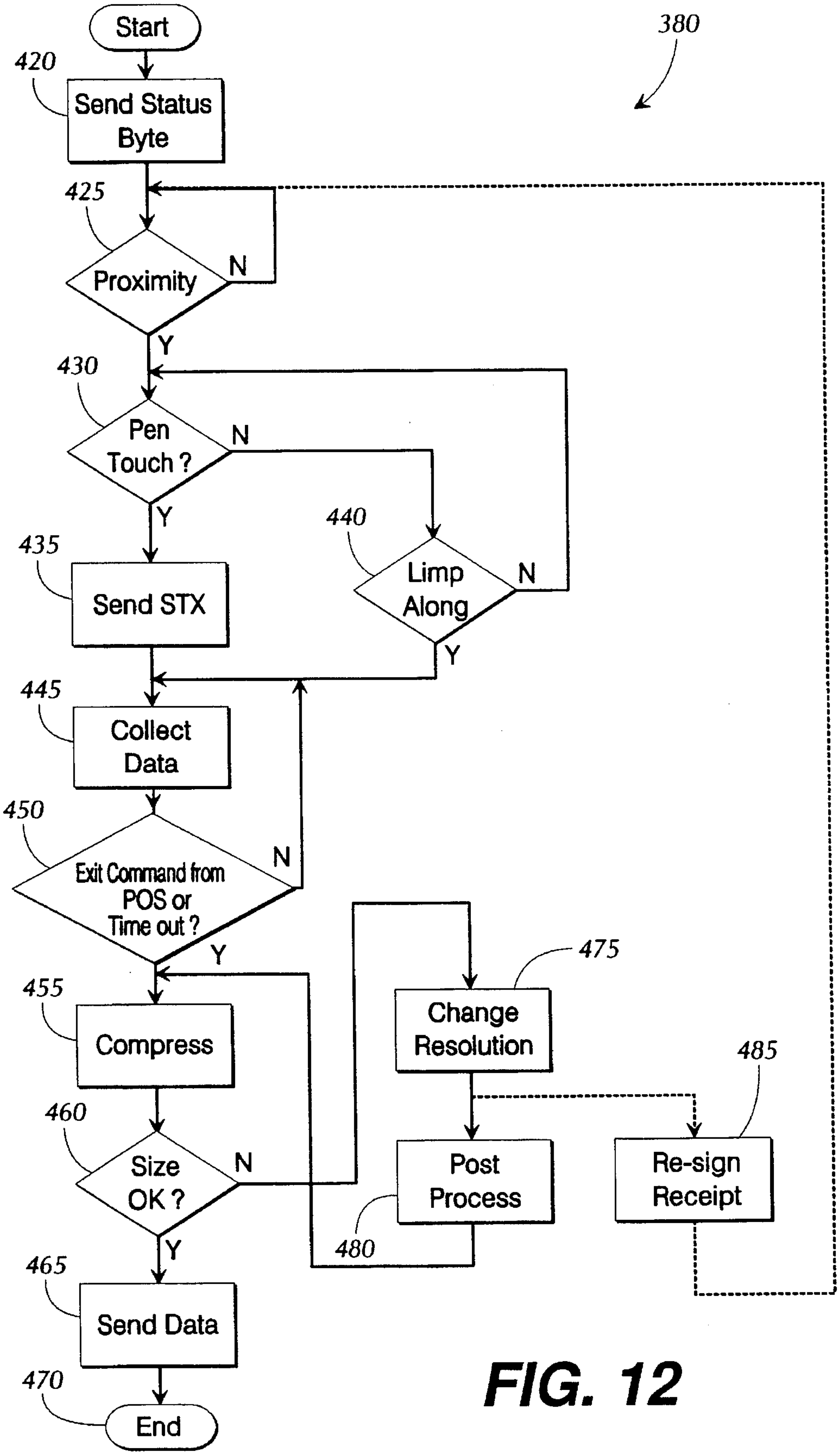
FIG. 12 is flow diagram illustrating the preferred Signature Capture/Compressed Data subroutine forming a part of the software method of FIG. 11.

Turning now to FIG. 12, the preferred "Signature Capture/Compressed Data" subroutine 380 will be described. Those skilled in the art will understand that the subroutine 380 is carded out identically in both the signature capture pad 10 and the signature capture/PIN pad 10', and that the term "signature pad" is intended to refer to either device.

The routine begins at step 420, where the signature pad sends to the POS system a status byte confirming that it has entered the compressed signature capture mode. At step 425, the routine determines whether the stylus 45 is in proximity to the digitizer grid 255. Those skilled in the art will understand that the digitizer grid 255 acts as an antenna to receive signals emitted by the stylus 45 and that the grid detects these signals before the stylus comes in contact with the receipt 35, urethane material 135, or housing top portion 20. This allows the digitizer to digitize signatures made on top of multi-part forms or other thick material. This provides an advantage over pressure sensitive digitizers, in which the pen or stylus must be in contact with the digitizer surface. The preferred signature pad is programmed to determine when the signals received by the grid 255 exceed a predetermined threshold level. At that point, the stylus 45 is deemed to be "in proximity" to the digitizer grid 255. The threshold level is a level below which the digitizer cannot provide an acceptable digitized signature. If the stylus is not in proximity, the routine loops back to step 425.

If, at step 425, the routine determines that the stylus is in proximity to the digitizer grid 255, the routine proceeds to step 430, and determines whether the stylus has come in contact with the receipt 35. When the stylus is in contact with the receipt, a switch closes and the CONTACT signal on the line 285 is asserted. At this point, the signature pad proceeds to step 435 and sends a start byte to the POS system.

If the stylus is determined not to be in contact with the receipt at step 430, the routine proceeds to step 440. At this point, the routine determines whether to enter a "limp along" mode. In the event the stylus switch that controls the CONTACT signal on line 285 is inoperative, this mode allows the digitizer to continue to function. Thus, if the stylus has been found to be in proximity at step 430 for a prolonged period of time, but the signal on the contact signal line 285 has not been asserted, the digitizer may proceed to step 445, where the digitizer begins to collect signature data. If the signature pad is not programmed to use the limp along mode, or other prerequisites for entering the limp-along mode are not satisfied, the routine returns to step 430.

At step 445, the digitizer begins to collect and store data associated with the signature as the receipt 35 is signed. The process of receiving and storing digitized signature signals from the digitizer continues until such time as the signature pad receives a "Exit Signature Capture Mode" instruction from the POS system, or the signature termination signal time out occurs. This process is illustrated by the loop including steps 445 and 450. Once the exit command or signature termination signal is received, the routine proceeds to step 455. Thus, the signature capture process continues until either of two events occurs. If a merchant observes that a customer has completed signing the receipt, the merchant may press a key that sends the "Exit Signature Capture Mode" instruction to the signature capture pad. In addition, the signature termination signal time out allows the merchant to perform other tasks and allow the signature capture pad to automatically exit the signature capture mode after the customer has completed the signature.

At step 455, the routine compresses the stored digitized signature signals to form compressed signature signals. The compression is performed in accordance with the preferred compression algorithm, which is described in the above-referenced signature capture terminal application.

At step 460, the routine compares the size of the compressed signature signals to the maximum signature size selected by the POS system. If the compressed signature signals are equal to or smaller than the maximum signature size, the routine proceeds to step 465, where the compressed signature signals are transmitted to the POS system. From step 465, the routine proceeds to step 470 and returns to the method 350.

Once the compressed signature signals are provided to the POS system, the POS system may decompress the signature signals and cause a facsimile signature corresponding to the signature signals to be printed on the printer 100 or displayed on display 95'. The merchant determines whether the facsimile signature is acceptable. If not, the merchant may press a button indicating that the transaction is to be terminated. If so, the merchant may press a button indicating that the signature is acceptable, and that the transaction should be completed.

Returning now to step 460, if the compressed signature signals exceed the maximum signature size, the routine advances to step 475. At this step, the routine causes the digitizer resolution to be changed from its current setting to the next lower setting. At step 480, the routine post-processes the original stored digitized signature signals to form secondary digital signature signals having lower resolution. These secondary signature signals are then compressed at step 455, and the routine returns to make the size comparison at step 460.

Those skilled in the an will appreciate that instead of post-processing the original data at step 480, the routine could call for the receipt to be signed a second time, and the second signature could be digitized using the lower resolution selected at step 475. This process is contemplated by step 485 and the path show in dotted lines in FIG. 12. At step 485, the signature pad would send an signal to the POS system asking it to display on its display 95' a instruction to the operator. The instruction would direct the operator to have the customer re-sign the receipt. From step 485, the routine would return to step 425 and again carries out the process described above.

Figure 13:
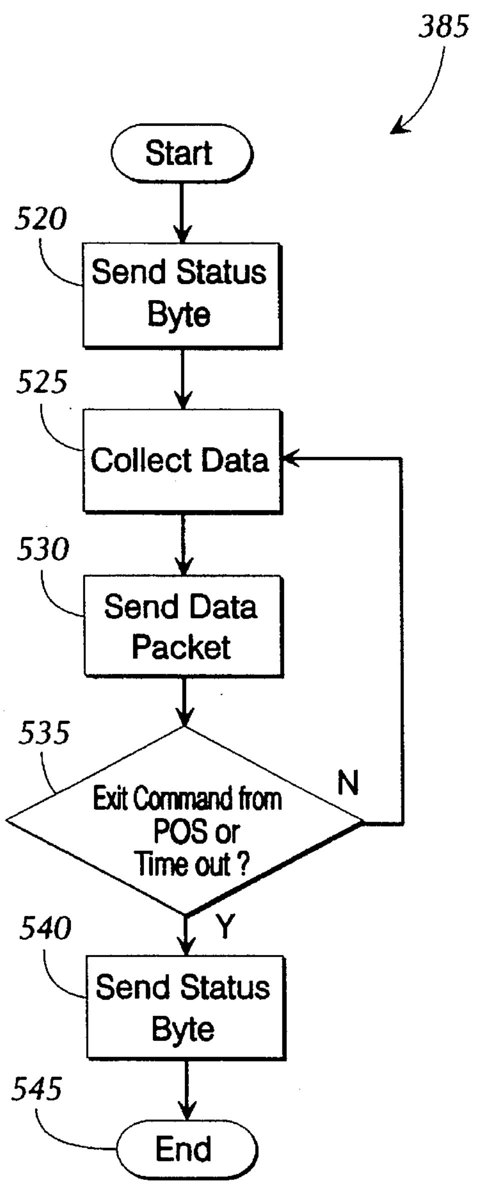
FIG. 13 is flow diagram illustrating the preferred Signature Capture/Raw Data subroutine forming a part of the software method of FIG. 11.

Turning now to FIG. 13, the preferred "Signature Capture/Raw Data" subroutine 385 will be described. This routine provides to the POS system digitized signature signals in the form of X and Y coordinates. The data is provided in real time at the report rate determined by the signature capture pad. The present inventors contemplate that the raw digital signature signals may used in a variety of ways by the POS system. In order to verify the quality of the digitized signature, the POS system may use the digitized signature signals to display a facsimile of the signature on a display or print a facsimile signature on a receipt. At that point, the operator may press a key indicating whether the signature is satisfactory. If so, the signature data will be retained by the POS system. If not, the signature data may be discarded and the customer asked to resign the receipt.

Once satisfactory signature data is acquired, the POS system may compress the digitized signature signals using an algorithm selected by the merchant. This provides the advantage of being able to update the compression algorithm as desired, and allows the compression to be done by POS terminals or by a central computer of some type. Those skilled in the art will understand that the subroutine 385 is carried out identically in both the signature capture pad 10 and the signature capture/PIN pad 10', and that the term "signature pad" is intended to refer to either device.

The routine begins at step 520, where the signature pad sends to the POS system a status byte confirming that it has entered the raw data signature capture mode. At step 525, the digitizer begins to collect digitized signature signals associated with the signature as the receipt 35 is signed. As each coordinate value is received at step 525, the routine proceeds to step 530 and transmits a data packet to the POS system. Each data packet transmitted to the POS system includes a header indicating that the stylus is in proximity to the digitizer grid, and whether the CONTACT signal is asserted.

The POS system may use the digitized signature signals to display a facsimile signature on a display, or print a facsimile signature on a printer. This allows the merchant to examine the signature and determine whether the signature is acceptable. If so, the merchant may indicate that the transaction should be completed. If not, the merchant may indicate that the transaction and signature capture cycle should be terminated.

The process of collecting and transmitting digital signature data continues until such time as the signature pad receives an "Exit Signature Capture Mode" instruction from the POS system, or the signature termination signal time out occurs. This process is illustrated by the loop including steps 525, 530, and 535. Once the exit command is received or the time out occurs, the routine proceeds to step 540 and sends a status byte to the POS system. From step 540, the routine proceeds to step 545, where it returns to the method 350.

Figure 14:
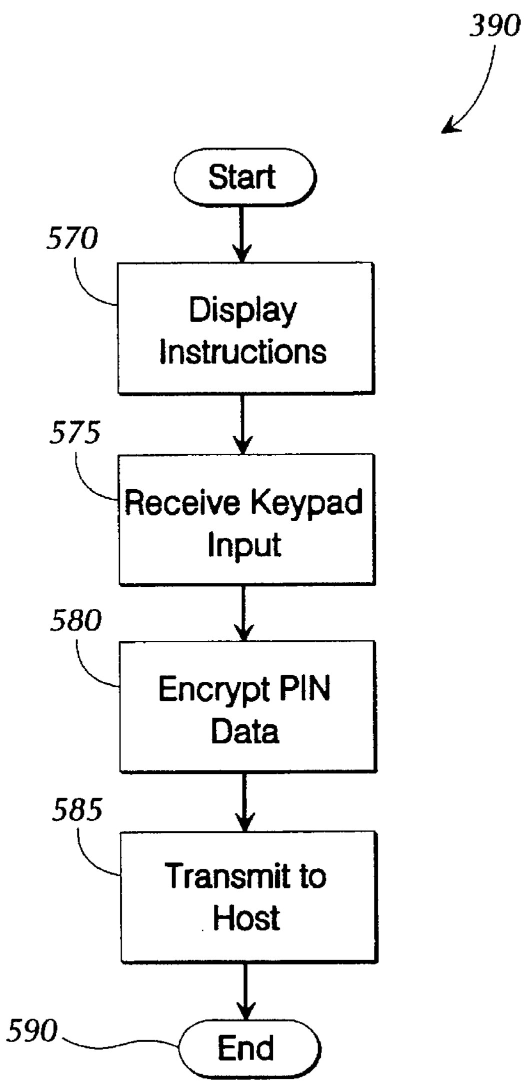
FIG. 14 is flow diagram illustrating the preferred Get PIN Data subroutine forming a part of the software method of FIG. 11.

FIG. 14 is a flow diagram illustrating the preferred "Get PIN Data" subroutine 390 that forms a part of the software method 350. Unlike the other subroutines discusses above, the routine 390 pertains only to signature capture/PIN pad 10', and assumes that said signature capture/PIN pad is equipped with the "dumb" PIN pad described above in conjunction with FIG. 9. Those skilled in the art will understand that a signature capture pad connected to a "smart" PIN pad will simply re-route serial data received from the POS system and intended for the smart PIN pad. In these cases, the signature pad will not execute any portion of the routine that acquires the PIN data.

At step 570, the terminal causes the PIN pad 60 to display a message on display 70 instructing the cardholder to enter his or her PIN. Once the message has been displayed, the subroutine proceeds to step 575.

At step 575, the terminal receives the PIN data that is entered via keypad 65. Once the PIN data has been entered, the subroutine goes to step 580 and encrypts the PIN data using the digital encryption standard (DES) algorithm, which will be known to those skilled in the art. At step 585, the encrypted PIN data is transmitted to the POS system. After the encrypted PIN data is provided to the POS system, the subroutine goes to step 585, and returns to method 350.

Figure 15:
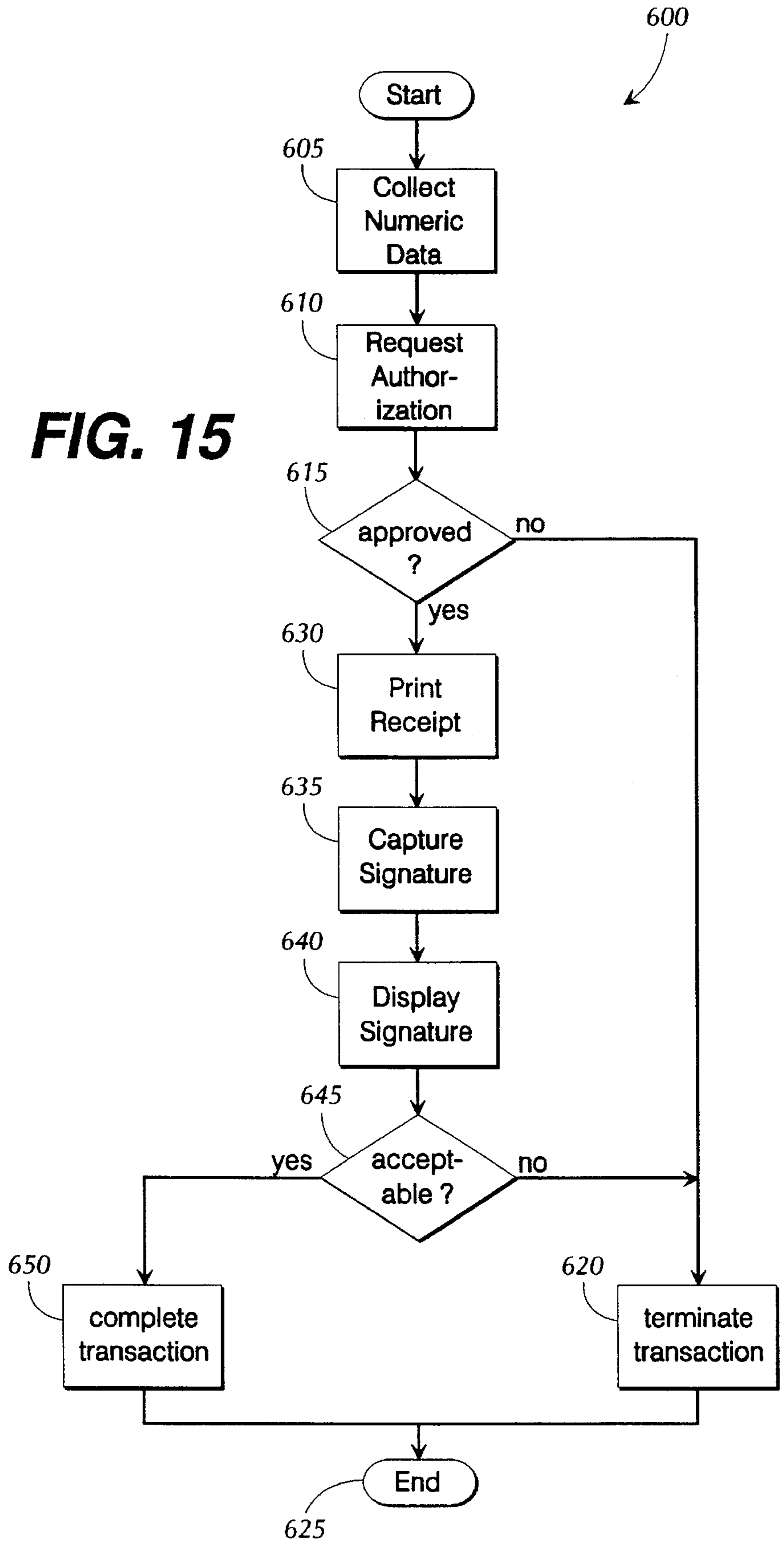
FIG. 15 is a flow diagram illustrating the preferred method of operating a point-of-sale terminal utilizing the signature capture pad of FIG. 1.

Based on the foregoing description of the signature capture pad 10, FIG. 15 provides a flow diagram illustrating the preferred method 600 of operating a POS system including a signature capture pad 10. The method begins at step 605, where the POS system collects numeric data associated with the transaction. This data includes, at a minimum, the date, purchase amount, credit card account number and expiration date. This data may be collected by the cash register, credit card transaction terminal, and/or magnetic stripe reader discussed above in conjunction with FIGS. 2A and 2B.

Once the numeric data is accumulated at step 605, the method advances to step 610, where the electronic cash register or credit card terminal requests authorization from an authorization source. This process requires the merchant to provide numeric data to the authorization source via telephone line or other communications means in the manner described in the above-referenced signature capture terminal application. The authorization source returns an authorization indicia to the POS terminal indicating whether the transaction is approved or declined.

At step 615, the POS terminal determines whether the authorization indicia received from the authorization source indicates that the transaction is approved or declined. If the transaction is declined, the method proceeds to step 620 and terminates the transaction without completing it. From step 620, the method advances to step 625, where the method 600 terminates.

Returning now to step 615, if the authorization indicia indicates that the authorization source has approved the transaction, the method advances to step 630, and causes the attached printer 100 to print a transaction receipt 35. The receipt includes numeric data, and a space for the customer's signature.

At step 635, the POS terminal captures the customer's signature. This requires the merchant to place the receipt 35 on the signature capture pad 10 or signature capture/PIN pad 10' with the signature line 40 positioned in the space indicated by the alignment guide 30. The POS terminal sends a signal to the signature capture pad indicated whether it is to provide compressed or uncompressed signature signals. This is discussed above in conjunction with FIG. 11. The process of capturing the signature continues until a signature termination signal is received by the signature pad.

At step 640, POS terminal has obtained the signature signals from the signature pad. These signals may be in the form of compressed signature signals, or uncompressed digitized signature signals, depending on the merchant's preference. At step 640, the POS terminal provides a facsimile signature corresponding to the signature signals. The facsimile signature may be displayed on a display 95' or printed by the printer 100. In either case, the merchant is provided with a facsimile signature that allows him or her to determine whether the captured signature is acceptable. A signature may be unacceptable if it fails to correspond to the authorized signature on the back of most credit cards, or if the resolution or quality of the digitized signature is otherwise inadequate. The merchant may indicate whether the facsimile signature is acceptable by pressing a key on the keypad 90, 90'.

At step 645, the method determines whether the merchant has indicated that the signature is acceptable or not. If not, the method proceeds to step 620, and causes the transaction to be terminated without being completed. From step 620, the method advances to step 625, where the method 600 terminates.

If the signature is deemed acceptable at step 645, the method proceeds to step 650, and causes the transaction to be completed. This step includes causing the POS terminal to form a transaction data packet by associating the signature signals received from the signature pad with the numeric data collected at step 605 and the authorization indicia received at step 610. This transaction data packet is provided to the merchant's credit card transaction processor in the manner described in the above-referenced signature capture terminal application. From step 650, the method 600 proceeds to step 625, where it terminates.

From the foregoing, it will be understood that there has been described apparatus and methods of operating an adjunct signature capture terminal in conjunction with a system having a terminal, such an electronic cash register, at the point of sale. The signature capture pad 10 or signature capture/PIN pad 10' is connected for data communications with the POS terminal. The signature capture pad is operative for acquiring digital signature information independently of the electronic cash register, the signature information being related to a transaction being handled at the cash register.

In particular, the present invention is suitable for connection for communications in series between the electronic cash register and other peripheral devices, especially where the cash register only has a limited number (perhaps only one) of data communications ports. With the present invention, a communications cable or wire provided from the cash register at the POS may advantageously be utilized to connect the signature capture pad to one of the cash register's available serial ports and a second cable or wire may be used to connect the peripheral device to a second port on the signature capture pad.

As thus connected, the signature capture pad is operative for receiving signals between the electronic cash register and the peripheral device, determining the intended destination of the signals, responding to predetermined signals intended for the signature capture pad by performing functions associated with the signature pad, and forwarding remaining signals to their intended destination. In some cases where the electronic cash register includes a displaying means for displaying information, the signature pad may request the electronic cash register to display a message on the displaying means associated with an action to be take at the signature pad.

The preferred signature capture pad, being adjunct to the POS cash register, collects signature data via a digitizer means associated with the signature capture pad, and provides the collected signature data to the POS system. In most cases, the POS system will include a terminal, such as an electronic cash register, including means for receiving numeric data associated with a transaction. The POS system may be operative for receiving numeric transaction data from the electronic cash register, obtaining the signature data from the signature capture pad, combining the numeric transaction data with the signature data, and transmitting the combined numeric data and signature data to a host computer. In addition, the POS system may utilize a display or a printer to produce a facsimile signature corresponding to the signature signals received from the signature capture pad, and thus allow the merchant to indicate whether the digitized signature is acceptable.

Portable Signature Capture Pad

Figure 16:
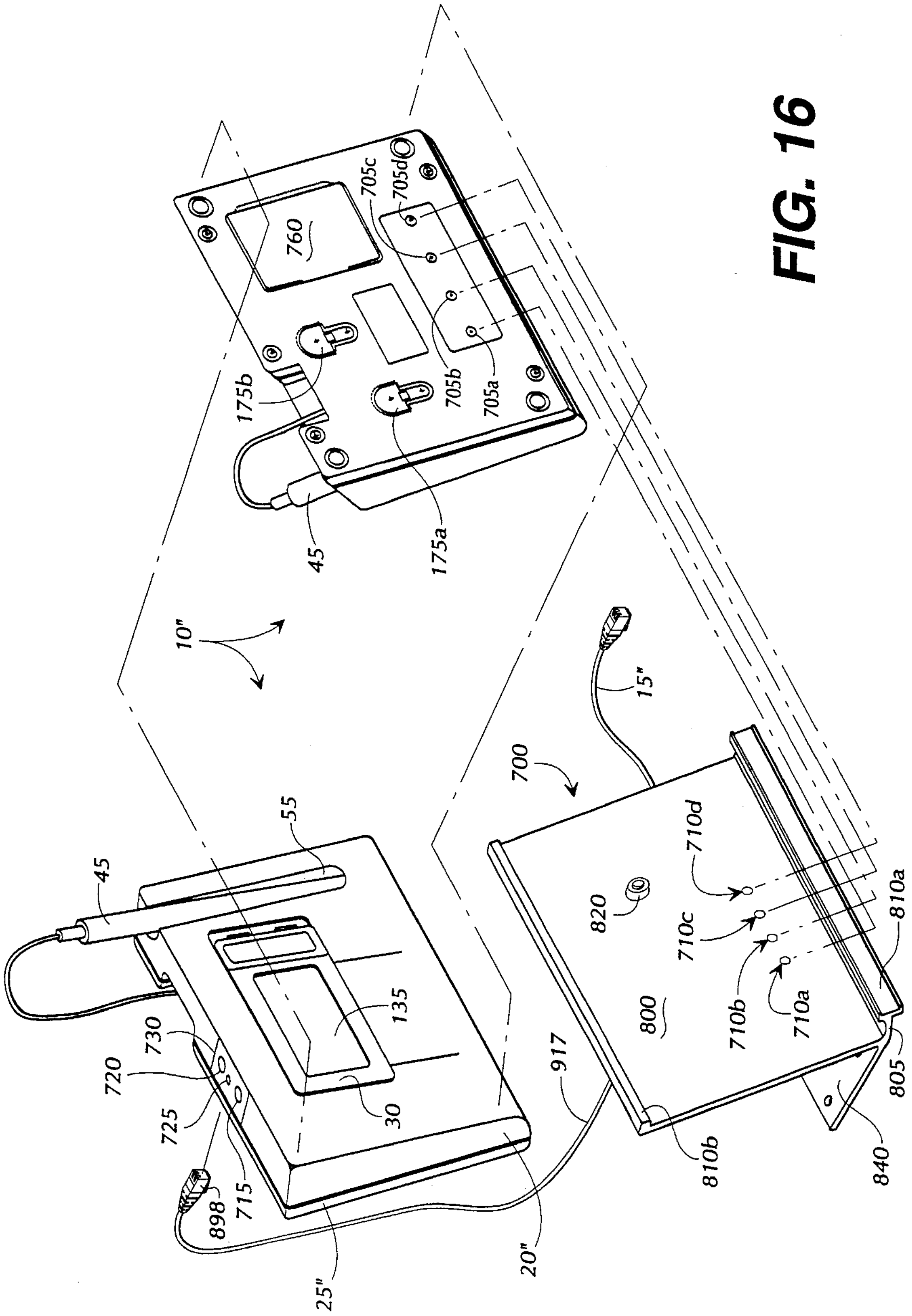
FIG. 16 is a perspective view of a portable signature capture pad and an associated portable signature capture pad cradle constructed in accordance with an alternative preferred embodiment of the present invention.

FIG. 16 shows a portable signature capture pad 10" and corresponding signature capture pad cradle 700 constructed in accordance with an alternative preferred embodiment of the present invention. The portable pad is similar to the signature capture pads 10 and 10' in that it is designed to be used with a POS host system such as the POS systems 72 and 72' in FIGS. 2A and 2B, respectively. The POS system (not shown) used with the portable pad may also utilize a peripheral device (not shown), such as the peripheral device 115 in FIG. 2B, where the peripheral device is connected to the pad cradle in a manner described in detail below.

The portable signature capture pad 10" differs from the signature capture pads 10 and 10' in that it is operative to capture transaction information remotely from the POS system, store the captured transaction information, and later transmit the information to the POS system through a wireless data link, comprising data transceivers 705*a–d* and 710*a–d*, between the portable pad and the cradle 700, respectively.

It will be understood that, although the following discussion relates to a portable signature capture pad, a personal identification number (PIN) pad (not illustrated) could be employed alone or together with the signature digitizer in a portable data capture device. Much of the structure and operation is the same for a signature capture application, a PIN pad application, or a combination signature capture/PIN pad application. It will therefore be appreciated that the inventions described herein relate to various types of portable data capture device structure and operation.

FIG. 16 shows a perspective view of the portable signature capture pad 10" and the pad cradle 700. In FIG. 16, the cradle is shown along with the front side of the portable signature capture pad 10". Also in FIG. 16, the portable pad is flipped so as to show the rear side of the pad and to show the communications link (indicated by the dotted lines) between the pad and the cradle. As can be seen, data transceivers 705*a–d* are located in the rear of the portable pad and comprise the pad portion of a wireless data link. These data transceivers, discussed in greater detail below, are preferably infrared light-emitting diodes for data transmission and phototransistor detectors for data reception. However, the data transceivers may also utilize RF communication or other equivalent communications means well known to those skilled in the art.

Figure 17:
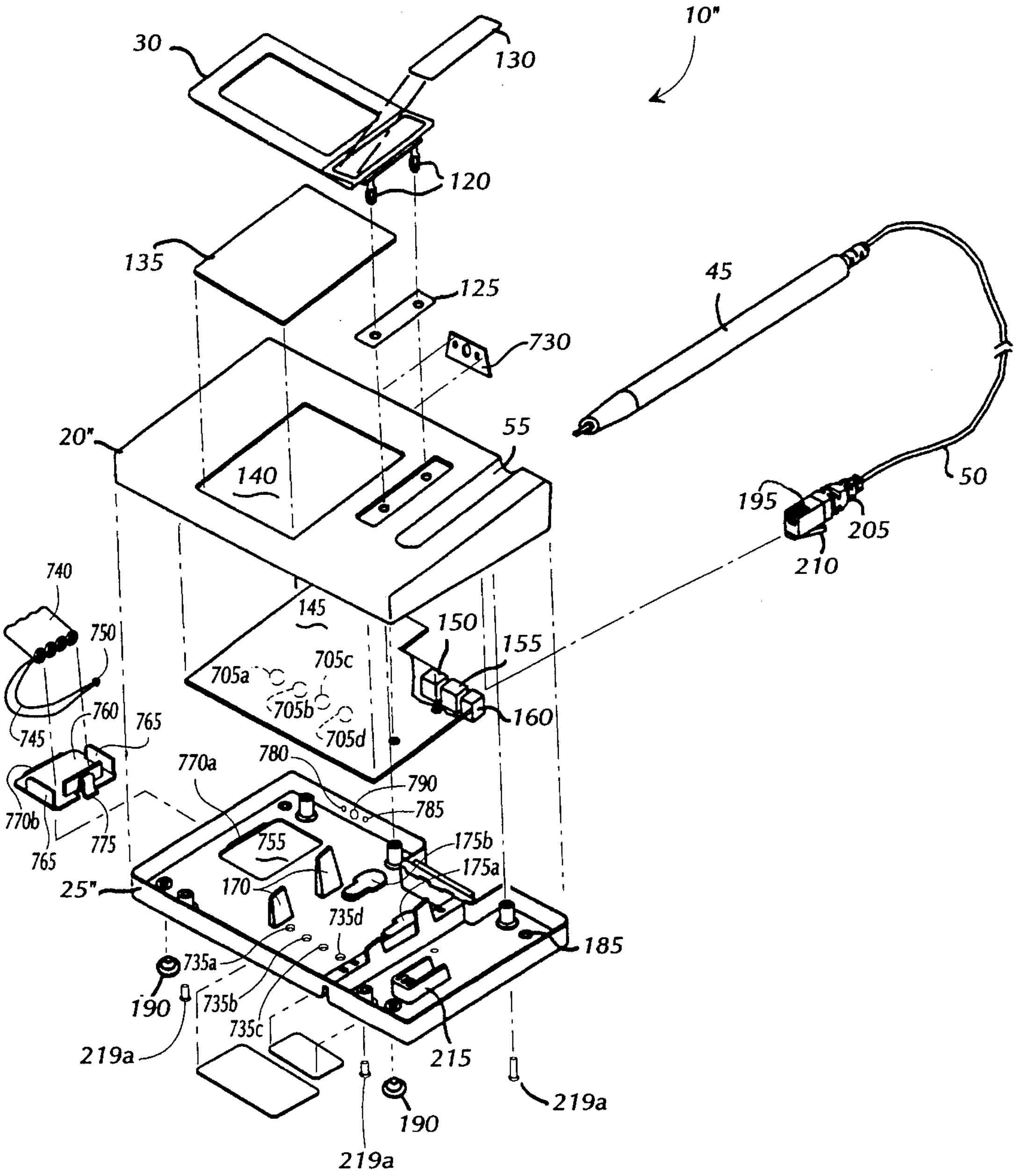
FIG. 17 is an exploded view of the portable signature capture pad of FIG. 16.

Referring still to FIG. 16, the portable signature capture pad 10" also differs from signature capture pads 10 and 10' in that it includes status light emitting diodes (LEDs) 715 and 720, a battery charger port 725 and face plate 730 in the upper housing 20", with corresponding circuitry (not shown) for the LEDs and the battery charger port located also on a PCB 145 (shown in FIG. 17). The LED 715 turns on to warn the merchant when the power level of the portable pad drops below 50% of its full power capacity. The LED 720 is illuminated to inform the merchant when the portable pad has received a "Ready" signal from the POS host system that activates the portable pad for signature capture. The battery charger port is connected to a power source (described below) of the portable pad and facilitates charging of the power source in a manner also described in detail below.

FIG. 17 is an exploded view of the portable signature capture pad 10" of FIG. 16. As best seen in FIG. 17, the data transceivers 705*a–d* are mounted on the bottom side of the PCB 145 and are connected to the portable signature capture pad circuitry on the PCB in a manner well known to those skilled in the art. The PCB is then mounted in a lower housing 25" so that the data transceivers are aligned with optical pathway openings 735*a–d*, providing an unimpeded optical pathway for the data transceivers.

FIG. 17 also illustrates the battery pack 740 that powers the portable signature capture pad 10". This battery pack preferably consists of four NiCad rechargeable batteries enclosed in a shrinkwrap package and connected in series by PVC insulated 22 AWG stranded wire as shown at 745. The battery pack preferably has the following specifications:

| | |
|---|---|
| battery voltage | 4.8 VDC nominal; |
| battery capacity | 500 mAh; |
| battery life | 1000 charge/discharge cycles |
| capacity after 1000 charge cycles | 75% initial capacity |

Preferably the battery cell type is a Sanyo N-600AA or an equivalent thereof. The battery connector 750 is preferably a JST XHP-2 connector having SXH-001T-PO.6 contacts. The battery connector is plugged into the PCB 145 to provide power to the portable signature capture pad 10". The battery pack 740 is held inside an allotted space located underneath the PCB 145 and defined within the lower housing opening 755. The battery door 760 secures the battery pack underneath the PCB within the lower housing 25" as the opening slideably receives battery door guides 765, the door slot receptacle 770*a* receives door slot 770*b* and the door tab 775 engages an edge of the housing opening in a snap fit.

FIG. 17 also illustrates preformed molded openings 780, 785, and 790 in the lower housing 25". LEDs 715 and 720 are mounted at the top of the PCB 145 and fit through the openings 780 and 785, respectively. Similarly, battery charger port 725 is mounted on the PCB, is operatively connected to the battery pack 740, and is aligned with the preformed molded opening 790. Face plate 730 is then mounted over the openings.

Figure 18:
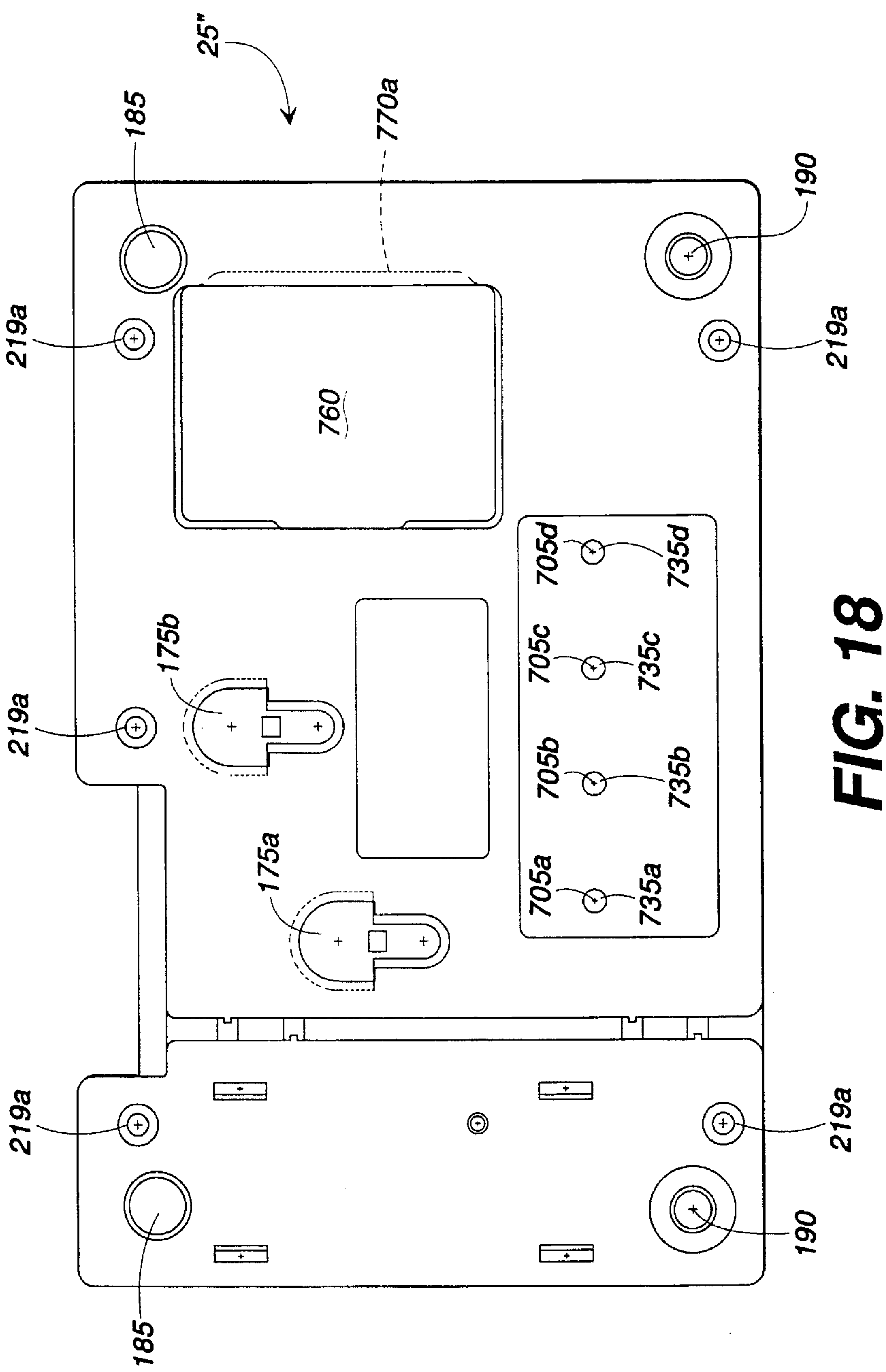
FIG. 18 is a bottom plan view of the portable signature capture pad of FIG. 16.

FIG. 18 shows the bottom of the fully assembled portable signature capture pad 10" from its rear housing 25". The data transceivers 705*a–d* are aligned with the openings 735*a–d* in a slightly recessed manner so that the portable pad, when properly placed into the cradle 700, lies flush against the cradle, allowing the data transceivers to be in operative proximity to the cradle data transceivers 710*a–d*. Similarly, the battery pack door 760 is constructed so that, when it is secured in the opening 755 by door slot 770*b* and door tab 775 in the manner described above, the battery door 760 lies flush with the bottom face of the lower housing, allowing the data transceivers to be in operative proximity to the cradle data transceivers when the portable pad is correctly positioned in the cradle.

Figure 19:
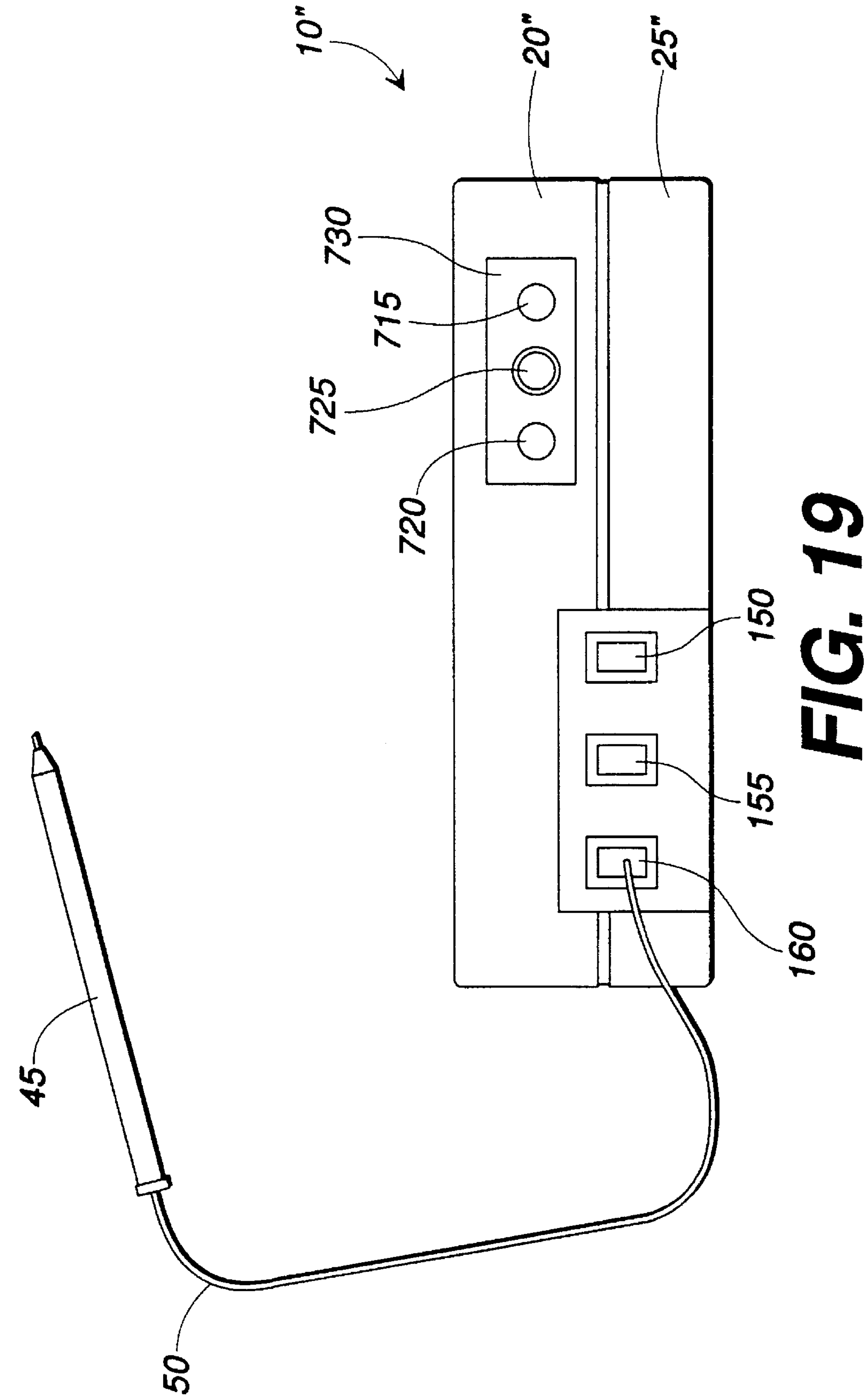
FIG. 19 is a rear elevational view of the portable signature capture pad of FIG. 16.

FIG. 19 illustrates the placement of the LEDs 715 and 720, the battery charger port 725 and the face plate 730 in the upper housing 20". The portable signature capture pad 10", as with the signature capture pads 10 and 10', includes the host serial port 150, the peripheral serial port 155 and the accompanying circuitry, alternately allowing a physical connection of the portable pad to the POS system. As discussed below, the LED 715 is illuminated when the battery pack 740 falls to a power level below 50% of its full power capacity. The LED 720 is illuminated and functions as a visual "Ready" signal in response to the POS system activating, or arming, the portable pad for signature capture in a manner described in more detail below.

Portable Pad Cradle

Turning again to FIG. 16, the views of the signature capture pad cradle 700 reveal the data transceivers 710*a–d* that comprise the cradle portion of the wireless data link. These data transceivers communicate with the data transceivers 705*a–d* in the portable signature capture pad 10". As with the portable pad data transceivers, the cradle data transceivers are preferably sets of infrared light-emitting diodes for data transmission and phototransistor detectors for data reception. However, the transceivers may utilize RF communication, or any other type of wireless mode of communication well known to those skilled in the art and corresponding to the mode of communication used in the data transceivers in the portable pad.

The cradle 700, and not the portable signature capture pad 10", is physically connected to the POS system through a host interface cable 15, allowing the portable pad to be removed from the cradle to receive the customer's signature while communication between the portable pad and the POS system is temporarily suspended.

Figure 20:
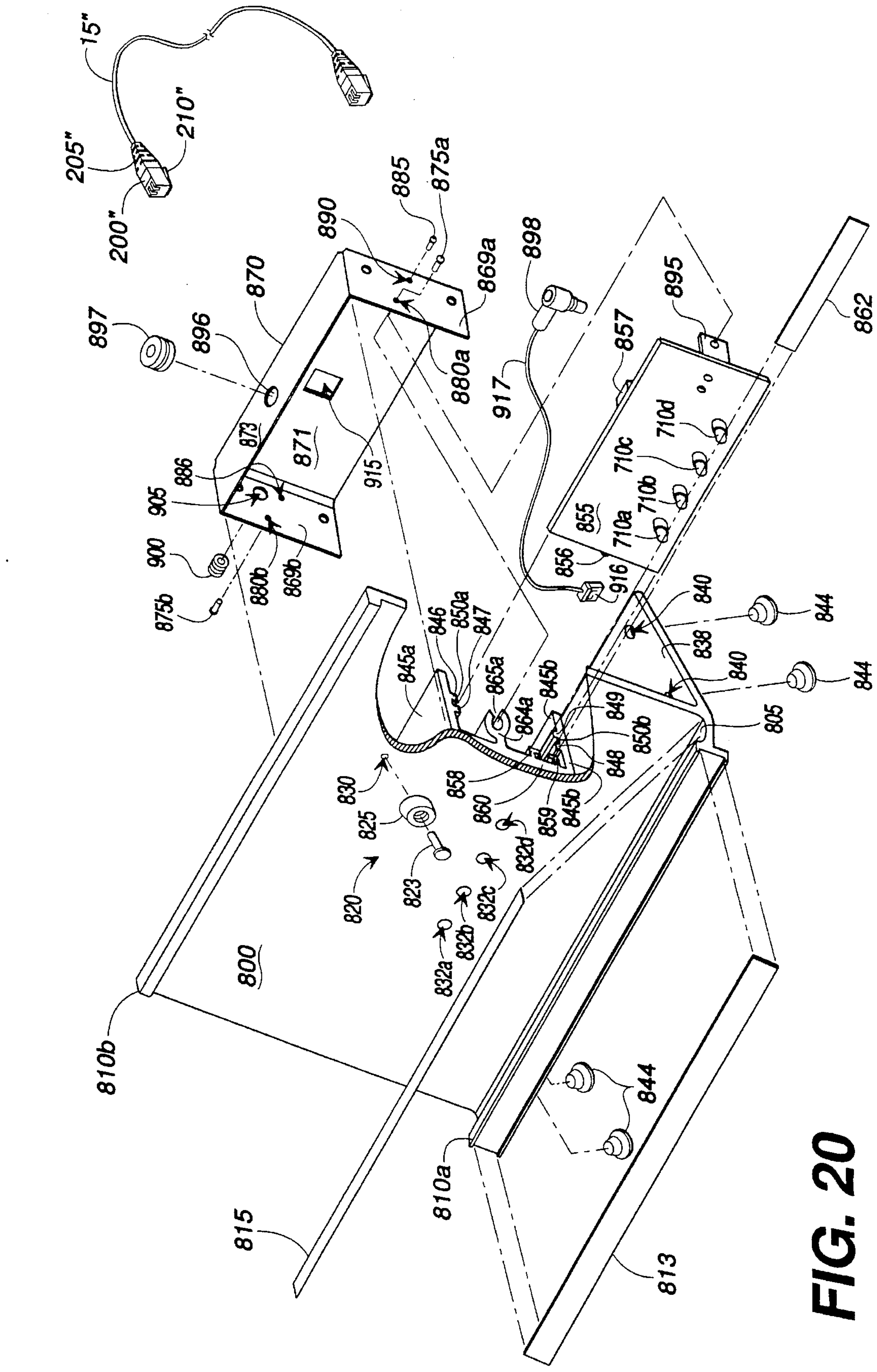
FIG. 20 is an exploded view of the portable signature capture pad cradle of FIG. 16, with a portion cut away to reveal the rear side thereof.

FIG. 20 best illustrates the preferred embodiment of the signature capture pad cradle 700 with a portion thereof cut away to reveal the rear configuration of the cradle. The cradle is preferably a one piece aluminum extrusion. However, it should be appreciated that the cradle may also be formed from high density plastic or any other equivalent material and may be constructed from individual assembled components.

As shown in FIG. 20, the front portion of the cradle 700 comprises a vertically extending panel 800 positioned at a slight angular incline, a stop 805 connected to the lower edge of the panel and extending outwardly in a direction perpendicular relative to the panel, a lower lip 810*a* extending upwardly from the stop in a direction parallel to the panel, and an upper lip 810*b* extending outwardly from the top of the panel in a direction parallel to the stop. The panel, the stop, and the lower lip form a channel into which the portable pad 10" is placed. The upper lip and the panel engage the pad when it is placed in the channel of the cradle and further provide for a tight, secure fit of the portable pad in the cradle. The logo plate 813 is secured to the front face of the lower lip. Cushion tape 815 is adhered to the stop to prevent the cradle 700 from scratching the pad, to prevent sliding of the portable pad in the cradle and to further provide a secure fit of the pad in the cradle.

A locator foot, shown generally at 820 and comprising a grommet 825 molded to fit around a stud 823 is secured in a hole 830 in the panel 800. The locator foot 820 positions the portable signature capture pad 10" so that the data transceivers 705*a–d* are in alignment with the data transceivers 710*a–d*. The locator foot 820 aligns the portable pad by engaging the notch 175*b* in the lower housing 25" (see FIG. 18) as the portable pad is placed in the cradle 700. In addition to the hole, the panel also includes optical pathway openings 832*a–d* through which the cradle data transceivers communicate with the portable pad data transceivers.

Turning now to the rear of the cradle 700, shown by the partial cut-away view of FIG. 20, a base 838 extends horizontally outwardly from the panel 800, giving the cradle added stability as the merchant removes and replaces the portable signature capture pad 10". The base includes holes 840 into which the rubber feet 844 are inserted. (The holes on the left side of the cradle in FIG. 20, into which the rubber feet are placed, are hidden from view.) The rubber feet provide added stability to the cradle, prevent slipping of the cradle on smooth surfaces such as glass and prevent the cradle from scratching surfaces on which the cradle is placed.

Two shelves 845*a* and 845*b* extend outwardly from the rear of the panel 800. Upper shelf 845*a* has two parallel downwardly extending guides 846 and 847 which define a groove 850*a*. Similarly, lower shelf 845*b* has two parallel upwardly extending guides 848 and 849 which define a groove 850*b*. The grooves are in alignment with one another to receive and retain a cradle printed circuit board (PCB) 855. The cradle PCB, in addition to containing the data transceivers 710*a–d* on its front side, also contains (1) a battery charging circuit (see FIG. 21) for controlling the charging of the battery pack 740 in the portable signature capture pad 10"; (2) a peripheral connector port 857 for receiving a peripheral connector jack 200 of a peripheral connector cable 15, which is operative for connecting the cradle 700 to a host device 115; and (3) a charge indicator LED 856 that indicates when the battery pack is being charged.

The rear of the panel 800 also contains flanges 858 and 859 which define a slot 860. The slot is configured to receive a filter lens 862 and to retain the filter lens between the optical pathway openings 832*a–d* and the data transceivers 710*a–d*. The filter lens prevents dirt, dust and other particulate matter from impeding the optical pathway of the data transceivers. The filter lens also prevents ambient light from causing data errors during communication between the data transceivers 705*a–d* and 710*a–d*.

The rear of the panel 800 also contains tubular members 864*a* and 864*b* which define screw holes 865*a* and 865*b*, respectively (the member 864*b* and the screw hole 865*b* are hidden behind the panel 800 in FIG. 20). The screw holes are adjacent to sides 869*a* and 869*b*, respectively, of a rear cradle cover 870 when the rear cradle cover is positioned over the shelf 845*a*.

A rear cradle cover 870 is positioned over the shelf 845*a* to protect the circuitry and the data transceivers 710*a–d* on the cradle PCB 855. The rear cradle cover has sides 869*a* and 869*b*, back 871 and top 873. Rear cradle cover sides include cradle cover holes 880*a* and 880*b*. The rear cradle cover side further includes bracket hole 890. The rear cradle cover side further includes an LED hole 886 through which a cradle charger LED 856 protrudes. Screws 875*a* and 875*b* are inserted through cradle cover holes and into screw holes 865*a* and 865*b*, respectively, of the rear panel wall to secure the rear cradle cover 870 over the cradle PCB and the filter lens 862. PCB screw 885 is inserted through the bracket hole and is fastened into the cradle PCB bracket 895 to additionally secure the cradle PCB in place.

Still referring to FIG. 20, the rear cradle cover top 873 also includes a grommet hole 896 which holds a rear rubber grommet 897. The charger plug 898, discussed in more detail below, is placed in the rear rubber grommet during periods of nonuse. The rear cradle cover side 869*b* also includes a bushing hole 905, into which a strain relief bushing 900 is inserted. A charging cord 917, terminated at one end by a charge cord jack 916 and at the other end by the charger plug, is connected to the cradle PCB 855 by insertion of the charge cord jack into a charging cord port 918 (shown in FIG. 21) on the PCB 855. The charging cord extends from the charging cord port and out of the rear cradle cover 870 through the strain relief bushing. The strain relief bushing thus prevents wear of the charging cord against the bushing hole.

Still referring to FIG. 20, the rear cradle cover back 871 includes a peripheral connector port opening 915. A peripheral connector port 857 is accessed through this opening. The peripheral connector jack 200 of the peripheral connector cable 15 is plugged into the port and thus into the cradle PCB 855. The connection of the peripheral connector cable to the cradle PCB 855 in this manner allows the host 115 to communicate directly with the portable signature capture pad 10" when the portable pad is properly placed in the cradle 700 so that the data transceivers 705*a–d* are in operative proximity with the cradle data transceivers 710*a–d*. The signature capture pad cradle 700 is transparent to the POS system during communication between the data transceivers.

Portable Pad Circuitry

Figure 21:
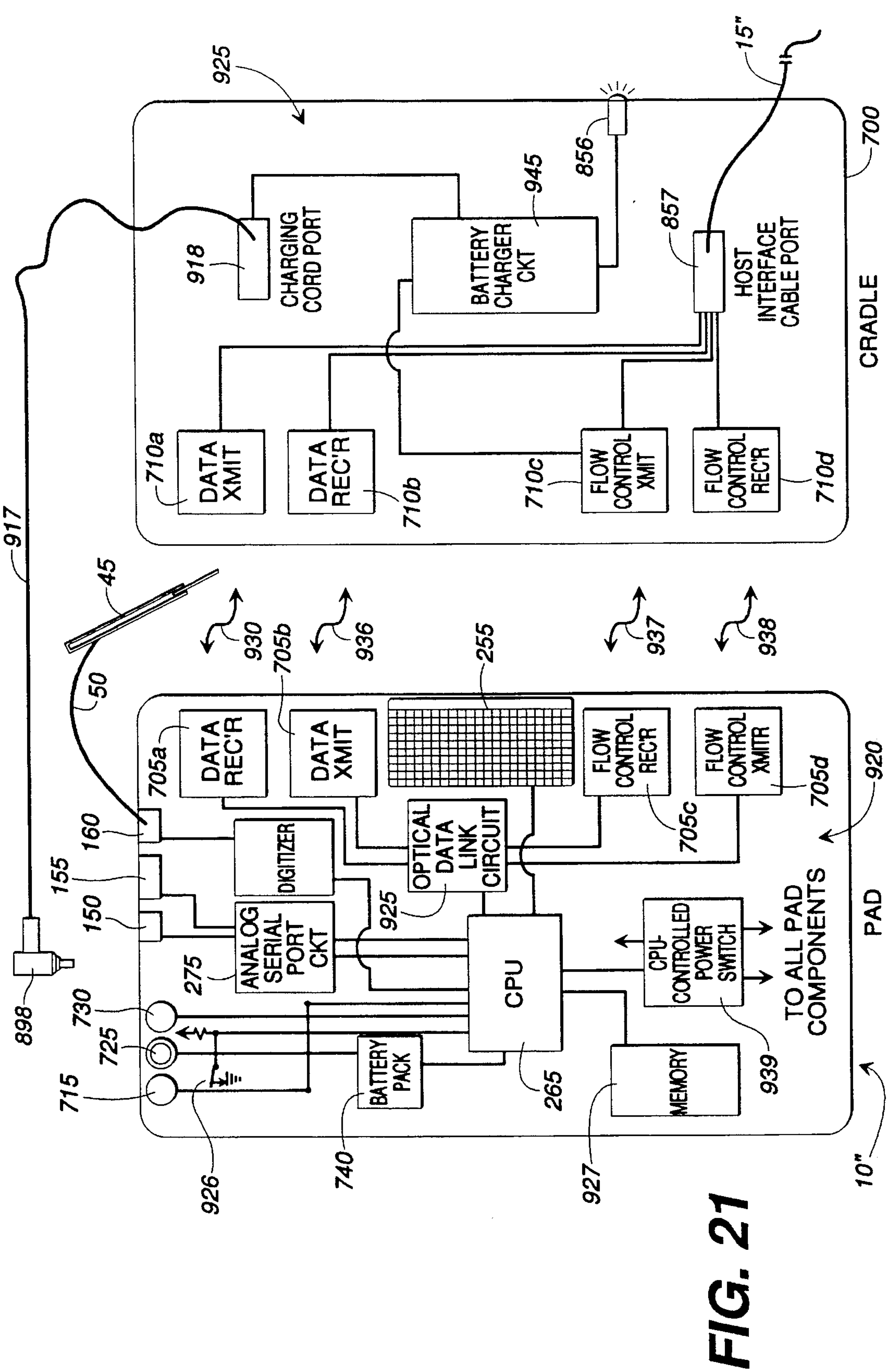
FIG. 21 is a block diagrammatic representation of the electronic circuitry employed in the preferred portable signature capture pad.

FIG. 21 is a block diagrammatic representation of the electronic circuitry 920 and 925 of the portable signature capture pad 10" and the cradle 700, respectively.

As with the signature capture pads 10 and 10', the portable signature capture pad 10" is operative to capture the customer's signature through the digitizer 255. However, the portable pad captures the signature while disconnected from communication with the POS system. The portable pad stores the captured signature signals in the 32K of static RAM memory 927 connected to the CPU 265 (which is identical to the CPU in signature capture pads 10 and 10').

As illustrated in FIG. 21, the data transceivers 705*a–d* and 710*a–d* each perform a specific function. The data receiver 705*a* receives data from the data transmitter 710*a* as indicated by the communication signal at 930. The signal is processed through optical data link circuitry 935 and then passed on to the CPU 265. The data transmitter 705*b* transmits data from the portable signature capture pad 10" to the data receiver 710*b* as indicated by the communication signal at 936. The data receiver passes data in this signal on to the host 110 through the host interface cable 15, which is connected to the cradle 700 at the host interface cable port 857.

Similarly, the flow control receiver 705*c* receives flow control instructions from the flow control transmitter 710*c*, as indicated by the communication signal at 937. The flow control transmitter 705*d* sends flow control signals to the flow control receiver 710*d*, as indicated by the communication signal at 938. Through these sets of transceivers, data flow between the portable pad and the POS system is controlled with a CTS/RTS (clear to send/ready to send) type protocol known to those skilled in the art.

When the charging plug 898 is plugged into the portable pad, the cradle circuitry multiplexes the flow control transceivers 705*c* and 710*c* to perform a second "charging indication" control function. Signals from the host and the battery charging circuit 945 are ORed through this link. During charging, a switch 926 in the portable pad signals the CPU 265 that the charger plug 898 is plugged into the battery charger port 725. In response, the normal RTS function is disabled and the transceivers 705*c* and 710*c* become a charging indicator link. When the portable pad has been fully charged, the charging circuit sends a "full charge" signal back through the charging indicator link to the portable pad to inform the portable pad that the battery pack 740 is at full power capacity. In response to this signal, the CPU turns off the pad LED 715, thus indicating to the merchant that the charging process is finished.

Still referring to FIG. 21, the battery charging circuit 945 charges the battery pack 740 when the charger plug 898 is plugged into the battery charger port 725. A CPU-controlled switch 939 is connected to all pad components and disables the components while the battery circuit is charging. The preferred battery charging circuit specifications are as follows:

| | |
|---|---|
| Charger input voltage | +9.0 to +20 VDC |
| Logic power supply voltage | +5.0 VDC +/- 5% |
| Maximum charging current | 285 mA maximum |
| Logic operating current | 75 mA maximum |
| Battery pack quick charge current | 250 mA |
| Battery pack trickle charge current | 32 mA |
| Maximum charge time | 3.5 hours |
| Charging method | minus delta V cutoff with timer backup. Continuous trickle charge after full charge. |

Still referring to FIG. 21, the signature pad cradle 700 is connected to the POS system (not shown) through the interface cable 15. The host interface cable is connected to a host interface port 857 on the PCB 855 through an 8 pin RJ-11connector. The port has the following specifications:

| PIN# | SIGNAL | DIRECTION | FUNCTION |
|---|---|---|---|
| 1 | PWR | In | Charge Power supply (+9 VDC to 20 VDC) |
| 2 | PWR | In | Logic Power supply (+5 VDC) |
| 3 | CTS | In | High = OK for pad to TX to host |
| 4 | RTS | Out | High = OK for host |
| 5 | TX Data | Out | Transmit data |
| 6 | RX Data | In | Receive data |
| 7 | GND | In | Signal ground |

-continued

| PIN# | SIGNAL | DIRECTION | FUNCTION |
|---|---|---|---|
| 8 | GND | In | Signal ground |

All other hardware and software components shown in FIG. 21 are identical to the corresponding components in the signature capture pads 10 and 10' and are discussed above.

Multiple Pads

At this point, it should be understood that multiple pads with one or more cradles may also be used in a POS environment. When multiple pads are used, each pad contains identification information so that, after a pad (1) is removed from a cradle; (2) captures a customer's signature; and (3) is returned to a cradle, the POS system associates the particular pad with the particular transaction through pad identification information. The identification information is a code received along with the "Ready" signal. The code may be unique to each pad and/or to each particular transaction. Alternatively, the identification information may be data permanently associated with each pad and read by the host system when (1) the POS system activates the portable signature capture pad for signature capture by sending the "Ready" signal; and (2) the portable signature capture pad is replaced in the cradle after capturing the customer's signature.

FIG. 22 shows a table reflecting the information the host computer in the POS system may track to correctly associate particular pads with particular transactions. As shown in the first column, each of the n portable pads in a particular POS environment has permanently or temporarily assigned identification information as described above. The cradle or cradles used in such a system provide an invisible communications link between the pad or pads and the POS host. Thus, multiple pads may be used in a system having only one cradle.

As shown in the second and third columns of FIG. 22, the host also tracks whether each pad is away from the cradle, and, if so, the host determines how long each pad has been away. If a pad has been away from a cradle for a predetermined amount of time (preferably 8–10 minutes—the time at which a portable pad will revert to a "Sleep" mode, as described in detail below in conjunction with FIG. 25), the host automatically times out the particular transaction and the transaction must be re-initiated by the merchant.

As shown in the fourth column of FIG. 22, the host tracks whether the signature data associated with a particular transaction has been downloaded from the pad associated with that transaction. As indicated in the fifth column, the host checks the appropriate bit (B) in the status byte in the pad register to see if the power level is low. If so, the host can indicate this low power level to the merchant by prompting the POS terminal to display a "Low Power" message. Finally, in the sixth column, the host tracks whether each pad is charging.

At this point, it should be understood that either a single portable pad and cradle, or multiple pads and cradles, may be used in a POS system, according to the needs of each particular merchant. Only minor software programming changes need be made at the host to accommodate one pad in a POS system, as opposed to the several pads described above.

Preferably, host commands, "Download Transaction ID" and "Upload Transaction ID" are provided for coordinating the operation of multiple portable pads. These commands both includes a Transaction ID, which comprises transaction identifier data that identifies a transaction being handled at the terminal. The unique transaction identifier is typically a credit authorization number or a host terminal identification number. The Transaction ID will be returned to the host together with the captured signature signals, as a part of the data communication from the portable pad to the host.

The Transaction ID is preferably unique to each transaction. In situations where there are plural portable pads used in close proximity, the Transaction ID prevents the host system from accepting the wrong signature if the terminal operator accidentally returns the wrong signature capture pad to the wrong cradle. Before activating the portable pad with a command to activate the pad ("Activate Pen/Digitizer"), the host is operative to download a unique transaction identifier to the portable pad with the Download Transaction ID command. The portable pad responds to the Download Transaction ID command by storing the Transaction ID in memory, for association with captured signature signals.

Later, after the operator returns the signature pad to the cradle, the host will check that the Transaction ID returned or uploaded with the captured signature is correct. Alternatively, the host can command separate uploading of the Transaction ID by providing a "Upload Transaction ID" command to a selected portable pad, preferably before uploading the captured signature signals.

In the preferred embodiment, the Transaction ID is a maximum length of 10 bytes, although more or less data could be provided if desired.

Alternatively, a permanent identifier stored in each portable pad of a plurality of pads could be utilized for coordinating operation with multiple pads. In such a situation, each pad stores a unique pad identifier in nonvolatile memory, e.g. ROM, and provides the pad identifier in response to an Upload Transaction ID command. The host could then coordinate which pad has which signature by first uploading the pad identifier from a selected cradle, signalling the merchant which pad is armed to receive the signature, and awaiting return of the pad to any cradle. The Upload Transaction ID command would again be issued, to ensure that the captured signature from the selected armed to receive the signature is matched up with the other transaction data.

Portable Pad Operation

Figure 23:
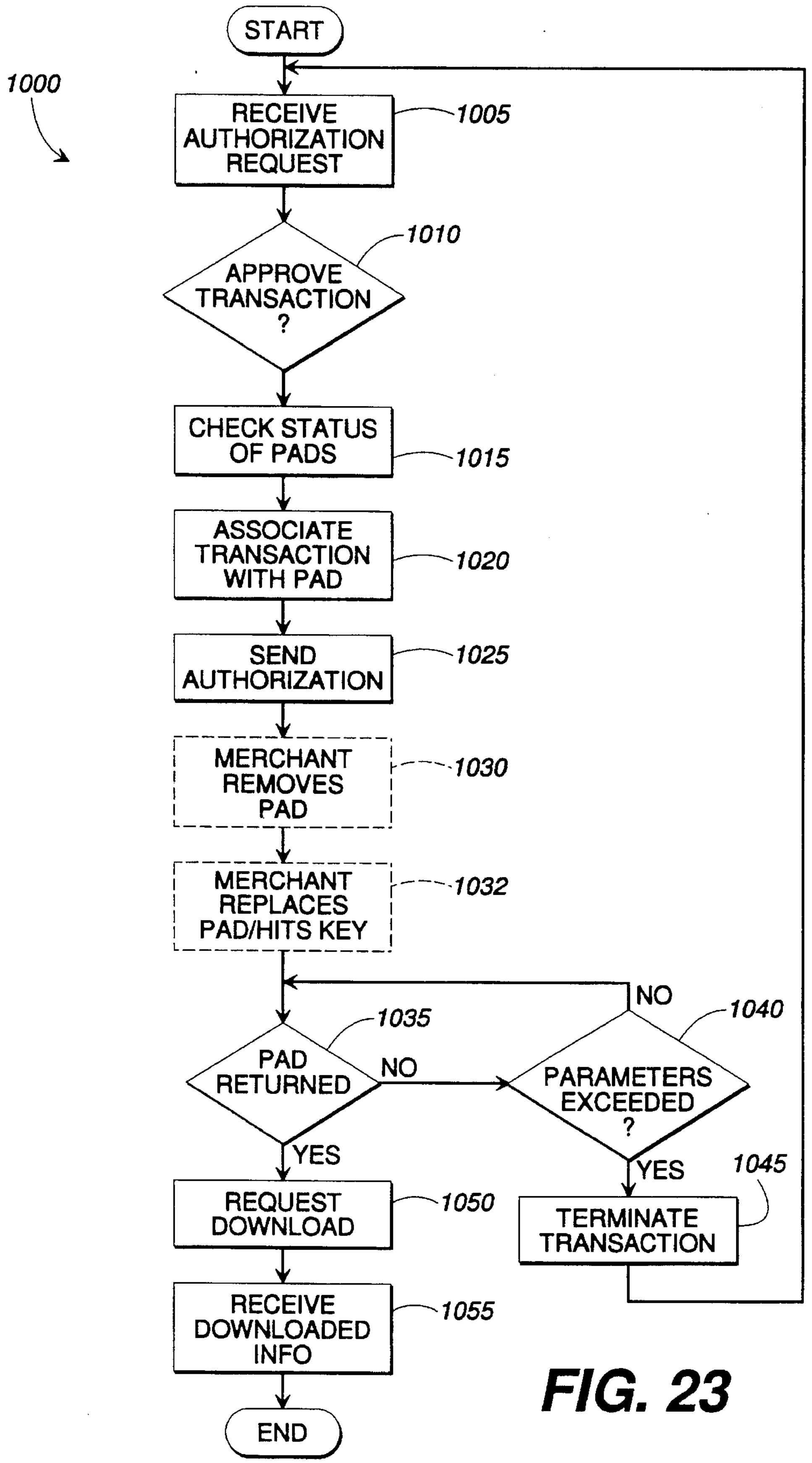
FIG. 23 is a flow diagram illustrating the main loop of the operation of a host computer system in communication with a portable pad POS system, implemented as computer software.

With the foregoing description of the portable signature capture pad 10" in mind, turn now FIG. 23 for discussion of a flow diagram illustrating the preferred method 1000 of operating a POS system including a portable pad or portable pads, as seen from the host computer. At step 1005, the host receives an authorization request for a particular transaction from a POS terminal. At step 1010, the host determines whether to approve a particular transaction based on the numeric data, such as credit card data and transaction amount, provided to it by the POS terminal. If the host denies authorization, the transaction is terminated. However, if the host at step 1015 approves the transaction, the host next checks the status of the pads in the POS system. The host checks pad status information associated with the pads as indicated in FIG. 23, and, based upon this information, associates a particular transaction with a particular pad at step 1020. At step 1025, the host sends authorization information, which includes both a command to the merchant at the POS terminal to "Get Signature" and a command sent to the particular pad associated with the transaction to arm the pad for signature capture.

At step 1030, the merchant, upon receiving the "Get Signature" command, and upon identifying the particular portable pad armed for signature capture when the LED 720 is illuminated, removes the pad from the cradle, places the receipt on the pad, and presents the pad to the customer for signature capture. At step 1032, the merchant replaces the portable pad in the cradle, and if the transaction is acceptable hits an "Exit Signature Capture Mode" key at the POS terminal to signal the host that the transaction signature has been captured. The host software used for the signature capture pads 10 and 10' is modified so that, at step 1035, the host queries whether the pad has been returned to the cradle once the merchant has hit the key on the POS terminal indicating that the pad has been replaced in the cradle with a signed receipt. These steps allow the merchant to abort the transaction before the transaction information is downloaded.

Subsequently, if the pad has not been returned to the cradle or positioned in the cradle so that the transceivers 705*a–d* and 710*a–d* are in operative proximity to one another, the host at step 1040 queries whether the parameters associated with the pad and the transaction have been exceeded. These parameters include both the total amount of time that the pad has been away from the cradle, as discussed above, and the number of times that the host prompts the merchant to "Check Pad Alignment". If the portable pad has been replaced in the cradle and the data transceivers are not in operative proximity with each other when the merchant enters "Exit Signature Capture Mode" instructions via the POS terminal key (discussed above) or as the pad automatically times out of the signature capture mode (discussed below), the POS system sends a "Check Pad Alignment" message to the merchant at the POS terminal display. If the portable pad is replaced a second time and the data transceivers are still not in alignment, the transaction is terminated. Alternatively, the merchant may attempt to replace the portable signature capture pad a number of times before the transaction is terminated. If any of the above parameters have been exceeded, the host terminates the transaction at step 1045, and the particular transaction must be reinitiated.

If the pad is returned to the cradle such that the transceivers of the pad and the transceivers of the pad and the cradle are placed in operative proximity to each other, the host and the pad establish a synchronous signal pattern and the host requests that transaction information be downloaded from the POS terminal and the portable pad at step 1050. At step 1055, the host receives the downloaded transaction information, including signature capture information from the portable pad, and the transaction is completed.

Figure 24:
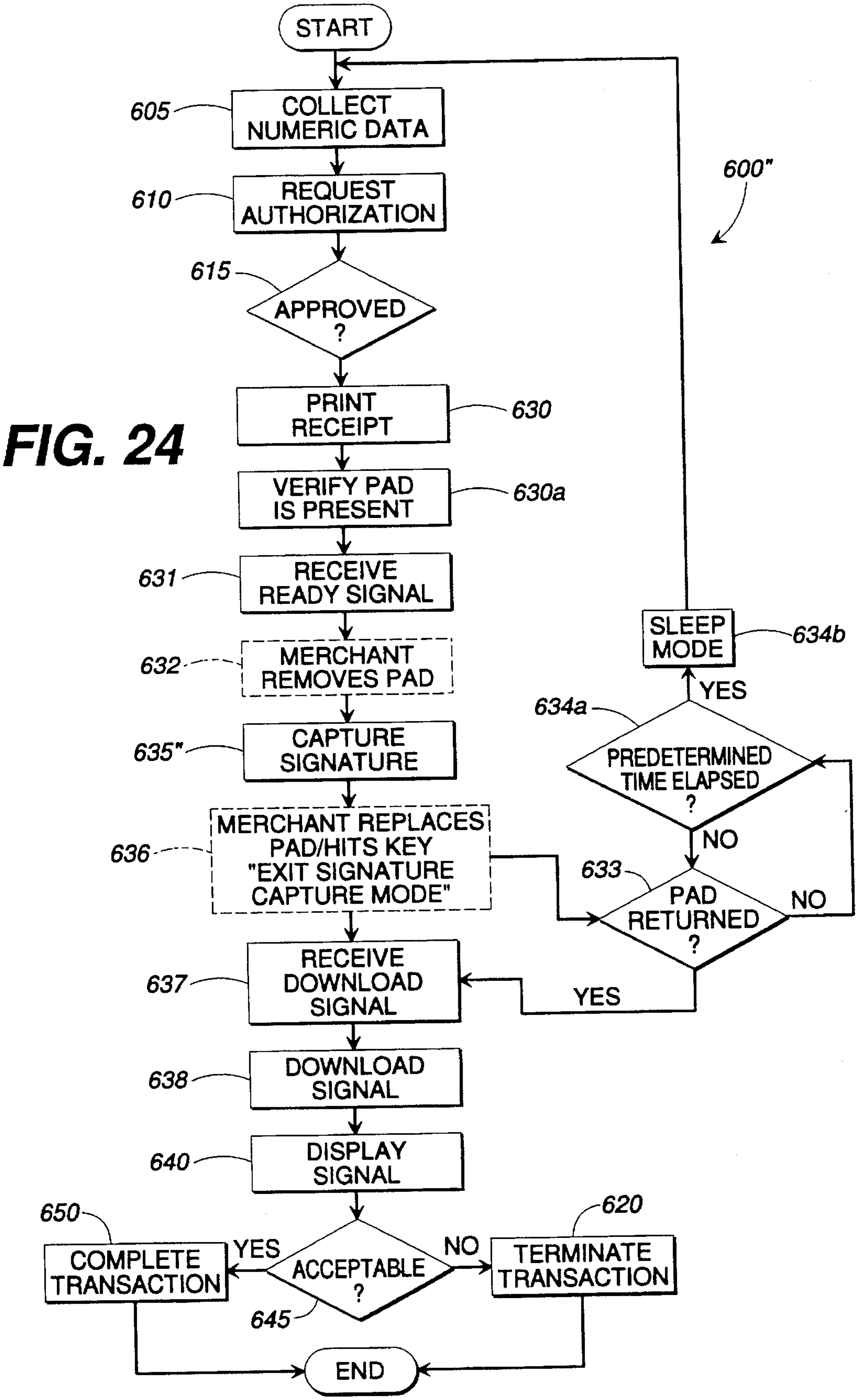
FIG. 24 is a flow diagram illustrating the main loop of the operation of a portable signature capture pad, implemented as computer software.

FIG. 24 provides a flow diagram illustrating the preferred method 600" of operating a POS system including a portable pad, as seen from a pad associated with a specific POS transaction. The method from steps 605 through 630 is identical to the method involved in operating a POS system including the signature capture pad 10, as illustrated in FIG. 15. The method differs, however, beginning at step 631.

The portable signature capture pad lapses into an idle, or "Sleep", mode during periods in which it is not activated. In this "Sleep" mode (described in more detail below in conjunction with FIG. 25), the portable pad uses less battery power than when it is activated. Upon initiation of the transaction, at step 631 the POS system checks to make sure that the pad is present in the cradle, and, if so, sends a "Ready" signal to the portable signature capture pad 10". Upon receiving this signal, the pad awakes from the "Sleep" mode and becomes armed for signature capture. The LED 720 subsequently turns on, thus prompting the merchant to remove the portable pad for signature capture.

At step 632, the merchant removes the portable pad 10" from the cradle 700 to receive the customer's signature on the printed receipt. During the time it is removed from the cradle, the portable pad is disconnected from communication with the POS system.

At step 635", the portable signature capture pad 10" captures the customer's signature. Step 635" is similar to step 635 in FIG. 15, except that the portable pad stores the digitized signature signals until the portable pad is returned to the cradle 700. Also, in addition to "Exit Signature Capture Mode" instructions entered by the merchant from the POS terminal key (discussed above), the portable pad may also contain signature termination circuitry (not shown) within the portable pad itself for activating an automatic timeout of the signature capture mode in the portable pad after a predetermined amount of time has elapsed after application of the last signature signal to the digitizer 255. The merchant then returns the pad to the cradle at step 636 and hits the POS terminal key indicating that the pad has been returned.

Subsequently, at step 633, the host queries whether the pad has been replaced in the cradle. At steps 634*a* and 634*b*, if the portable signature capture pad 10" has not been replaced in the cradle after a predetermined time, preferably about 8–10 minutes, the pad reverts to a "Sleep" mode, the captured information is lost and the method returns to step 605, where the transaction must be re-initiated.

If, at step 633, the merchant returns the pad to the cradle before the predetermined amount of time has elapsed, and the data transceivers of the pad and the cradle are placed in operative proximity to one another, the pad and the cradle 700 establish a synchronous signal pattern. The pad then receives a download command from the host to download the signature signals to the POS terminal, as indicated at step 637. The pad, upon receiving this command, downloads the signature signals to the POS system at step 638.

The method at steps 640 through 650 then is identical to the method shown in FIG. 15 corresponding to the signature capture pads 10 and 10'.

Portable Pad Battery Charging

Figure 25:
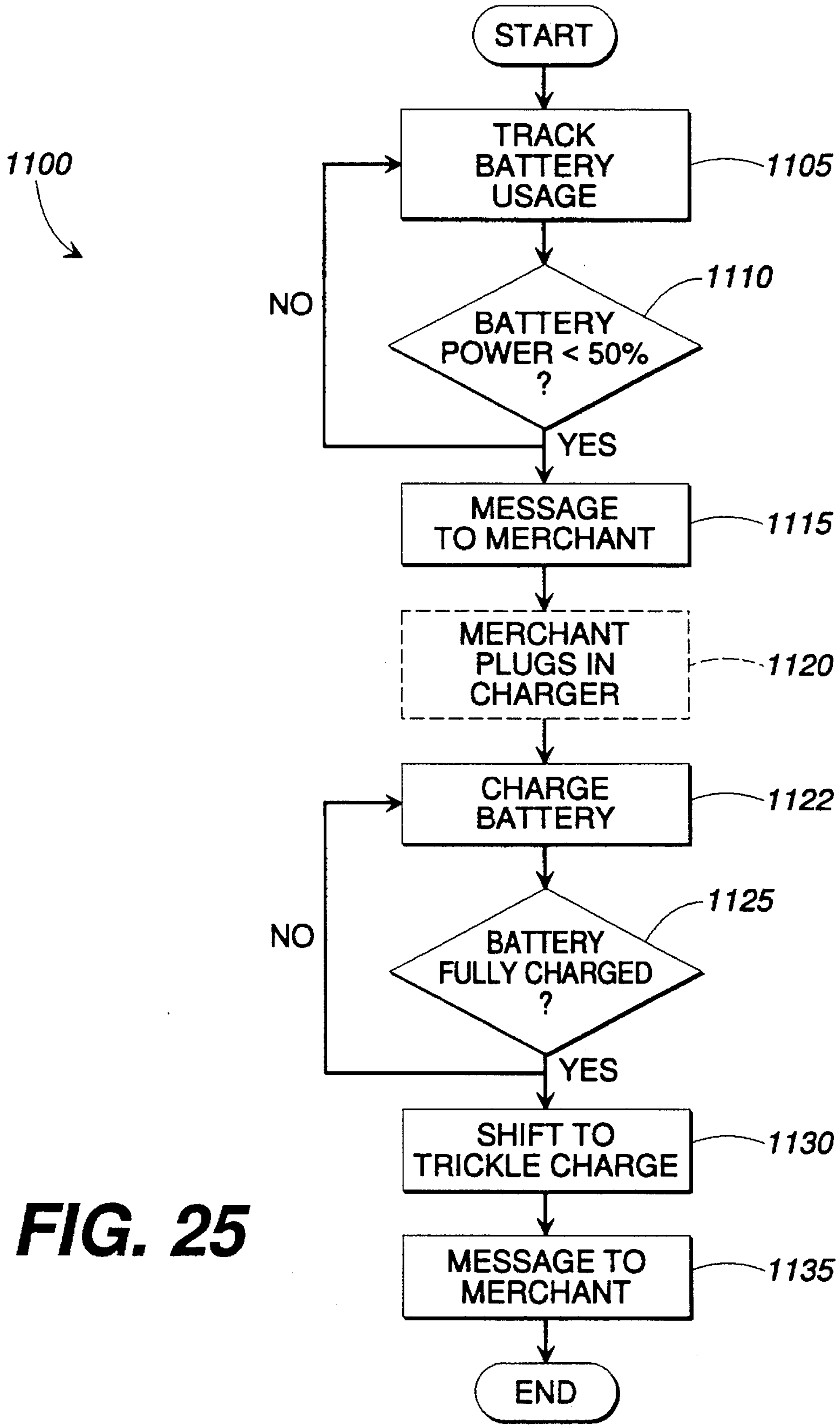
FIG. 25 is a flow diagram illustrating the preferred method of charging the battery of a portable signature pad utilizing the battery charging circuit contained in a portable signature capture pad cradle.

FIG. 25 provides a flow diagram illustrating the preferred method 1100 of charging the portable signature capture pad battery pack 740 through the host and the battery charging circuit 945 in the cradle 700. The method begins at step 1105, with the timing routine running in the pad itself. The routine reports via the low battery bit (B) in the status byte when battery power falls below 50%. In addition, the CPU preferably maintains a timing register (preferably, 24 bits resolution) in memory of the elapsed time of usage of the battery since the last charge. That 24 bit value can be transmitted to the host from the pad to give the host an estimated value of power left.

At step 1110, the host periodically queries the pad status bit. If the host detects that the power level in the battery pack 740 has dropped below 50% of its full power capacity, the host prompts the POS terminal display to display a message to the merchant at step 1115. The merchant is informed at the POS terminal display that the power level of the battery pack has dropped below 50%. Additionally, the merchant is informed of this low power level at the portable signature capture pad 10" when the LED 715 blinks in response to the low power level.

After receiving the low power level indication the merchant may continue to use the pad until the end of the business day, as the battery pack 740 has enough power to function for several more hours upon dropping to 50% of its full power capacity. At the end of the business day, the merchant plugs in the charger at step 1120, and the battery pack at step 1122 is charged by the battery charging circuit 945. With the pad placed in the cradle, the merchant inserts the charger plug 898 into the battery charger port 725 of the pad. The battery charging circuit charges the battery using a full charge current of 250 mA. As previously discussed, this current is provided to the battery charging circuit through the host interface cable 15. The charging status LED 856 on the cradle mirrors the LED 715 and is illuminated during charging to indicate to the merchant that the portable pad is being charged.

At step 1125, the pad queries during the charging process whether the battery pack has been fully charged. At step 1130, when the battery pack has been fully charged, the cradle sends a message to the pad CPU that the charging process is complete. In response, the LED 715 and the charging status LED 856 are simultaneously turned off by the CPU and the battery charging circuit 945, respectively. The battery charging circuit, upon sensing that the battery pack 740 has been charged, shifts the charging circuit to a trickle charge of 32 mA. This trickle charge is maintained until the merchant removes the charger plug 898 from the battery charger port 725. It should be understood that communication between the POS system and the pad is still possible during the charging process.

Additionally, at step 1135, when the battery pack 740 has reached full charge, the portable pad sends a message to the merchant at the display of the POS terminal indicating that the charging of the battery pack is complete. The merchant then removes the charger plug 898 from the battery charging port 725 and replaces the charging plug in the grommet 897. At this point, the charging process is completed.

It should be understood that, while the portable signature capture pad in the preferred embodiment remotely captures signature signals through a digitizer, the pad may also be configured to remotely acquire data through a personal identification number (PIN) keypad, a voice synthesizer, an integrated circuit (IC) data card or any other type of customer identification means, store the captured data, and download the data to a host computer upon re-establishment of a communications link between the portable pad and the host.

It should also be understood that the charging method for portable devices described above can also be implemented in other POS portable devices such as a PIN pad, a voice synthesizer, an integrated circuit (IC) data card or any other type of customer identification means that is powered by a rechargeable power source.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. In a system for recording transaction information associated with a financial transaction, including a terminal including an input device for obtaining numeric data associated with said transaction and an output device for providing a printed receipt, the improvement comprising:

a signature capture pad cradle connected to said terminal;

a portable signature capture pad held by said signature capture pad cradle, said portable pad comprising a housing, and a digitizer and a memory located within said housing;

said digitizer being operative to digitize signature signals in response to a start signal from said terminal, said signature signals corresponding to a signature written on said receipt;

said memory being operative to store said digitized signature signals; and a wireless data link being operative to connect said portable pad to said terminal through said cradle;

said portable pad being removable from said signature pad cradle to receive, digitize and store said signature signals, said digitized signature signals being downloaded from said memory to said terminal through said wireless data link in response to a signature download command from said terminal.

2. A system as recited in claim 1, wherein said wireless data link comprises infrared light-emitting diodes and phototransistor detectors located in both said portable pad and said cradle, said infrared light-emitting diodes and phototransistor detectors of said portable pad being operative for communicating data between said portable pad and said terminal through said infrared light-emitting diodes and said phototransistor detectors of said cradle when said portable pad is placed in said cradle such that said infrared light-emitting diodes and phototransistor detectors in both said portable pad and said cradle are in operative proximity with each other.

3. A system as recited in claim 1, wherein said signature capture pad cradle comprises:

a base;

a panel extending upwardly from said base at a slight angular incline, said panel having spaced apart top and bottom edges; and an elongated stop connected to said bottom edge of said panel;

said cradle infrared light-emitting diodes and phototransistor detectors being located on said panel;

said portable pad being in communication with said terminal when said portable pad is placed on said panel and said stop such that said infrared light-emitting diodes and phototransistor detectors in both said portable pad and said cradle are in operative proximity with each other.

4. A system as recited in claim 1, further comprising a circuit in said portable signature capture pad for terminating said signature capture mode after a specified amount of time has elapsed after said last signature signal has been captured by said digitizer.

5. A system as recited in claim 1, further comprising a visible indicator on said portable signature capture pad for indicating when said portable pad is activated for signature capture.

6. A system as recited in claim 1, wherein said portable pad further comprises a battery, said battery contained within said portable pad and being operative to provide power to said portable pad.

7. A system as recited in claim 6, further comprising a charging circuit for charging said battery, said charging circuit located on said cradle.

8. A system as recited in claim 7, further comprising:

a clock in said portable pad that tracks usage time of said battery; and a visible indicator on said portable pad for indicating when said battery falls below a specified level of power based upon data obtained from said clock.

9. A system as recited in claim 1, further comprising a device for holding said receipt on said portable signature capture pad.

10. A system for capturing data associated with a financial transaction, comprising:

a transaction terminal including a transaction data entry device for obtaining numeric data associated with said transaction;

a remote host computer for communicating with said terminal;

a portable data acquisition pad comprising:

a housing;

a processor located within said housing and operative to perform data capture subroutines in response to commands from said host;

an indicator operative to indicate to an operator that said portable data acquisition device is ready to capture data, said indicator being activated in response to said commands from said host;

a data capture device for capturing data corresponding to said transaction;

a memory operatively connected to said processor for storing said captured data; and a first set of wireless data transceivers operatively connected to said processor for communication with said host; and a data acquisition pad cradle operatively connected to said terminal and comprising a second set of wireless data transceivers, said data acquisition pad cradle being operative to hold said portable pad;

whereby said captured data stored in said portable pad is downloaded to said terminal in response to an operator-initiated signal from said transaction terminal, said captured data being downloaded through said first and second sets of data transceivers when said portable pad is placed in said cradle such that said first and second sets of data transceivers are in operative proximity to each other.

11. A system as recited in claim 10, wherein said data capture device comprises a digitizer.

12. A system as recited in claim 10, wherein said data capture device comprises a personal identification number (PIN) keypad.

13. A system as recited in claim 10, wherein said portable pad further comprises a battery located within said housing, said battery operative for providing power to said portable pad.

14. A system as recited in claim 13, wherein said portable pad further comprises first and second status indicators located on said pad and controllably illuminated by said pad, said first status indicator indicating the present operative relationship of said pad with said cradle, said second indicator indicating the charge status of said battery.

15. A system as recited in claim 10, further comprising charging circuitry located on said cradle for charging said battery.

16. A system as recited in claim 15, wherein said cradle further comprises a third status indicator located on said cradle to indicate said charge status of said battery and controllably illuminated by said charging circuitry.

17. A portable data capture pad, comprising;

a first wireless data transceiver for communication with a host system;

a data capture device for capturing data upon receiving a data capture command from said host system through said wireless data transceiver;

an indicator operative to indicate to an operator that said portable data capture device has received said data capture command; and a memory for storing said captured data and, in response to receipt of a download command from said host system, downloading said captured data through said wireless data transceiver to said host;

said portable pad being detached from said host to remotely acquire and store data upon receiving said data capture data command from said host, said portable pad being re-attached to said host through said first data transceiver to download said stored data to said host.

18. A portable data capture pad as recited in claim 17, further comprising a portable data capture pad cradle operatively connected to said host system and for holding said portable data capture pad, said cradle comprising a second data transceiver cooperative with said first data transceiver for facilitating attachment and detachment of said portable signature capture pad to said host system when said pad is positioned in said cradle such that said first and second data transceivers are in operative proximity to each other.

19. A portable data capture pad as recited in claim 18, further comprising a battery providing power to said pad.

20. A portable data capture pad as recited in claim 19, further comprising a battery charging circuit located on said cradle for charging said battery.

21. A portable data capture pad as recited in claim 20, further comprising a battery charging jack connected to said battery to allow charging of said battery by said battery charging circuit.

22. A portable data capture pad as recited in claim 19, further comprising a power measurement register in said portable pad for storing the charge status of said battery.

23. A portable data capture pad as recited in claim 22, wherein data in said power usage measurement register is downloaded to said host system via said wireless data transceiver.

24. A portable data capture pad as recited in claim 17, wherein said portable data capture pad downloads data upon receiving a download signal from said host system via said first and second data transceivers.

25. A portable data capture pad as recited in claim 17, wherein said data capture device comprises a signature digitizer.

26. A portable data capture pad as recited in claim 17, wherein said memory stores data from a plurality of transactions associated with said host system before downloading data to said terminal.

27. In a method for recording transaction information associated with a financial transaction, including the steps of providing a terminal including an input device for acquiring numeric data associated with the transaction, providing a remote host computer operative to communicate with the terminal, and providing a printed receipt in connection with the transaction, the improvement comprising the steps of:

providing a portable signature capture pad including a digitizer and a memory, said digitizer being operative to capture digitized signature signals corresponding to a signature applied to the receipt;

providing a signature capture pad cradle for holding the signature capture pad and for communicating digitized signature signals to the terminal through a wireless data link between the signature capture pad cradle and the portable signature capture pad;

providing a signature capture ready signal to said portable signature capture pad;

activating an indicator on said portable signature capture pad in response to said signature capture ready signal, said indicator being operative to indicate to an operator that said signature capture pad is ready to receive said signature;

removing the portable signature capture pad from the cradle for application of a written signature on the receipt;

placing the receipt upon the portable signature capture pad prior to obtaining the signature;

digitizing the signature to produce digitized signature signals;

storing the digitized signature signals in a memory in the portable signature capture pad;

replacing the portable signature capture pad in the signature capture pad cradle; and communicating the digitized signature signals to the terminal from the portable signature capture pad through the wireless data link.

28. A method as recited in claim 27, further comprising the step of compressing the digitized signature signals the said step of digitizing the signature.

29. A method as recited in claim 27, further comprising the step of charging a battery in the portable signature capture pad through a battery charger located on the signature capture pad cradle.

30. A method as recited in claim 29, wherein the portable signature capture pad includes a visible indicator, and further comprising the step of signalling a low battery condition via said visible indicator upon detection that the battery is low.

31. A method as recited in claim 27, further comprising the step of detecting that the portable signature capture pad has been replaced in the signature capture pad cradle before the step of communicating the signature signals to the terminal from the portable signature capture pad through the cradle.

32. In a method for recording transaction information associated with a financial transaction, including the steps of providing a terminal including an input device for acquiring numeric data associated with the transaction, providing a remote host computer operative to communicate with the terminal, and providing a printed receipt in connection with the transaction, the improvement comprising the steps of:

providing a portable signature capture pad comprising a digitizer and a memory, the digitizer being operative to provide digitized signature signals corresponding to a signature applied to the receipt, the memory operative to store the digitized signature signals;

providing a signature capture pad cradle for accepting the signature capture pad and communicating stored digitized signature signals to the terminal;

providing a signature capture start signal to said portable signature capture pad, said portable signature capture pad being operative to enter a signature capture mode in response to said signature capture state signal;

activating an indicator on said portable signature capture pad in response to said signature capture ready signal, said indicator being operative to indicate to an operator that said signature capture pad is operative to receive said signature;

removing the signature capture pad from the cradle for application of a written signature;

placing the printed receipt upon the signature capture pad prior to obtaining the signature;

digitizing the signature to produce the digitized signature signals;

placing the signature capture pad back in the cradle;

receiving a signature capture cycle termination signal from the terminal;

compressing the digitized signature signals to produce compressed signature signals; and communicating the compressed signature signals to the terminal from the signature capture pad through the cradle.

33. A method for controlling a plurality of portable data acquisition devices associated with a transaction terminal in communication with a host computer, comprising the steps of:

receiving at said transaction terminal transaction information associated with a transaction;

providing a start signal and device identification information to a selected one of said plurality of portable data acquisition devices;

removing said selected one of said plurality of portable acquisition devices from communication with said terminal in order to receive remote transaction information associated with said transaction;

storing at said selected one of said plurality of portable acquisition devices said remote transaction information;

resuming communication between said terminal and said selected one of said plurality of portable data acquisition devices;

transmitting from said selected one of said plurality of portable data acquisition devices to said terminal said remote transaction information and said device identification information;

confirming at said terminal that said device identification information corresponds to said transaction;

forming at said terminal a data packet comprising said remote transaction information and said transaction information; and transmitting said data packet to said host computer.

34. A method for controlling a plurality of portable data acquisition devices as recited in claim 33, wherein said portable data acquisition devices comprise portable signature captures pads and said remote transaction information comprises a signature.

35. A method for controlling a plurality of portable data acquisition devices as recited in claim 33, wherein said portable data acquisition devices comprise personal identification number (PIN) pads and said remote transaction information comprises a personal identification number.

36. A method for controlling a plurality of portable data acquisition devices as recited in claim 33, wherein the step of resuming communication comprises the steps of:

returning said selected one of said plurality of portable data acquisition devices to operative contact with said terminal; and providing a termination signal from said terminal to said selected one of said plurality of portable data acquisition devices.

37. A method for controlling a plurality of portable data acquisition devices as recited in claim 36, wherein said termination signal is provided in response to an input at said terminal from said user.

* * * * *